(12) United States Patent
Offutt et al.

(10) Patent No.: US 11,575,175 B2
(45) Date of Patent: Feb. 7, 2023

(54) BATTERY ASSEMBLY PROCESSES

(71) Applicant: Faraday & Future Inc., Gardena, CA (US)

(72) Inventors: Steven Harold Offutt, Costa Mesa, CA (US); Hrayr Torosyan, Sunland, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 17/191,109

(22) Filed: Mar. 3, 2021

(65) Prior Publication Data

US 2021/0194035 A1  Jun. 24, 2021

Related U.S. Application Data

(63) Continuation of application No. 15/630,812, filed on Jun. 22, 2017, now Pat. No. 10,950,884.

(60) Provisional application No. 62/353,352, filed on Jun. 22, 2016.

(51) Int. Cl.
| | |
|---|---|
| *H01M 50/20* | (2021.01) |
| *H01M 50/204* | (2021.01) |
| *H01M 10/04* | (2006.01) |
| *H01M 10/42* | (2006.01) |
| *H01M 50/213* | (2021.01) |

(52) U.S. Cl.
CPC ......... *H01M 50/204* (2021.01); *H01M 10/04* (2013.01); *H01M 10/425* (2013.01); *H01M 50/20* (2021.01); *H01M 50/213* (2021.01); *Y02E 60/10* (2013.01)

(58) Field of Classification Search
CPC ..... H01M 50/204; H01M 50/20; H01M 10/04
See application file for complete search history.

(56) References Cited

U.S. PATENT DOCUMENTS

| | | | |
|---|---|---|---|
| 2010/0196749 A1 | 8/2010 | Yoshida et al. | |
| 2012/0177970 A1* | 7/2012 | Marchio | H01M 50/10 429/120 |
| 2012/0301747 A1* | 11/2012 | Han | H01M 10/6566 429/7 |

FOREIGN PATENT DOCUMENTS

CN  102646851 A  8/2012

* cited by examiner

*Primary Examiner* — Olatunji A Godo
(74) *Attorney, Agent, or Firm* — Veros Legal Solutions, LLP

(57) ABSTRACT

A manufacturing process flow and accompanying methods for assembling a battery module are designed to increase efficiency, reduce a footprint of the manufacturing process, reduce manufacturing time, allow for increased flexibility, and reduce costs. The process flow takes advantage of robotic functionality to combine multiple manufacturing and quality assurance operations.

10 Claims, 25 Drawing Sheets

BATTERY ASSEMBLY PROCESSES

CROSS-REFERENCE TO RELATED APPLICATIONS

This application claims the benefit of U.S. Provisional Application No. 62/353,352, filed Jun. 22, 2016, and U.S. non-provisional application Ser. No. 15/630,812, filed Jun. 22, 2017, the entirety of each is hereby incorporated by reference.

BACKGROUND

Field

The present disclosure relates generally to manufacturing processes and, more particularly, but not by way of limitation, to process flows and methods for assembling battery modules.

SUMMARY

The present disclosure can be directed to a method for assembling a battery module. An exemplary method can include obtaining a battery module shell. A plurality of battery cells can be placed in the battery module shell. The battery cells can be electrically coupled and a control circuit can be electrically coupled to the battery cells.

According to additional exemplary embodiments, the present disclosure can be directed to a method for assembling battery module. An exemplary method can include obtaining a battery module shell for containing battery cells. The battery module shell can have a retainer plate with rows of openings adapted to at least partially receive battery cells therein. The battery cells can be arranged into rows corresponding to the rows of openings in the retainer plate. At least one row of the battery cells can be robotically grasped and then placed into at least one row of openings in the retainer plate while simultaneously electrically testing each battery cell. The battery cells can be electrically coupled. A control circuit can be electrically coupled to the battery cells.

According to further exemplary embodiments, the present disclosure can be directed to a method for assembling a battery module. An exemplary method can include obtaining a battery module shell for containing battery cells. The module shell can have a retainer plate with rows of openings adapted to at least partially receive battery cells therein. The battery cells can be arranged into rows corresponding to the rows of openings in the retainer plate. The battery cells can have an electrode end and a non-electrode end. At least one row of the battery cells can be robotically grasped and the following steps can be performed while continuing to grasp the battery cells: electrically testing each battery cell; placing an adhesive on the non-electrode end of each battery cell; and placing the non-electrode end of the battery cells into the openings in the retainer plate such that the adhesive contacts the retainer plate. The battery cells can be electrically coupled. A control circuit can be electrically coupled to the battery cells.

BRIEF DESCRIPTION OF THE DRAWINGS

Certain embodiments of the present disclosure are illustrated by the accompanying figures. It will be understood that the figures are not necessarily to scale and that details not necessary for an understanding of the technology, or that render other details difficult to perceive, may be omitted. It will be understood that the technology is not necessarily limited to the particular embodiments illustrated herein.

DETAILED DESCRIPTION

Figure 1:
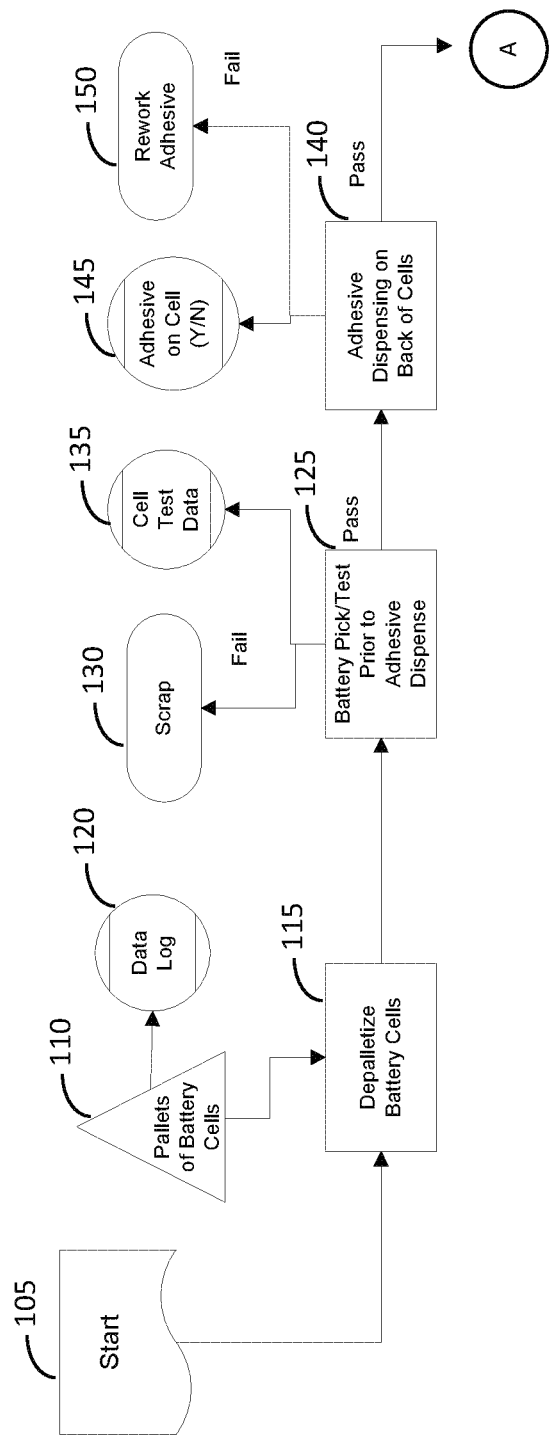
FIG. 1 is a partial process flow diagram for assembly of battery modules according to an exemplary implementation.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The present disclosure provides exemplary methods of assembly and manufacturing process flow for battery modules and strings of battery modules. Various embodiments of the process flow are described with respect to the steps illustrated in FIGS. 1-10, and assembly of parts along the process flow is illustrated in FIGS. 11-21B according to various embodiments.

Figure 9:
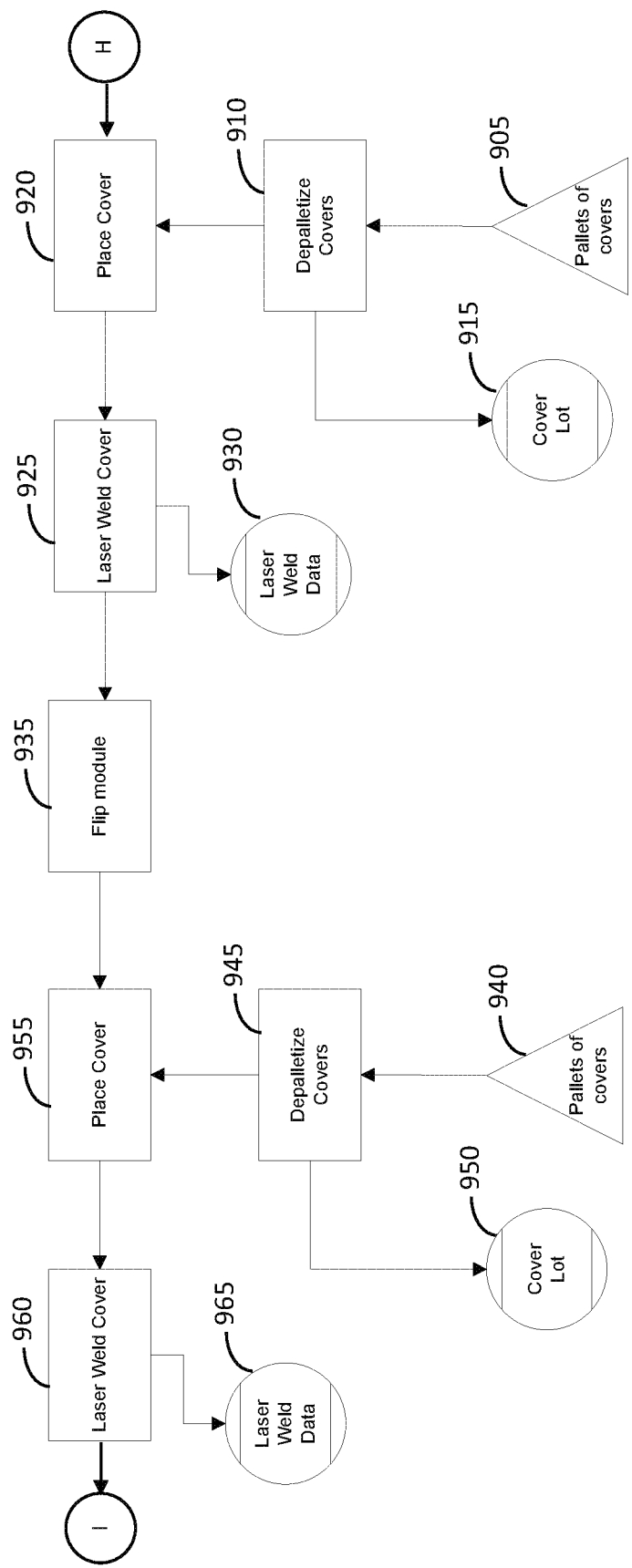
FIG. 9 is a partial process flow diagram for assembly of battery modules according to an exemplary implementation. Output I may continue to FIG. 10.
Figure 10:
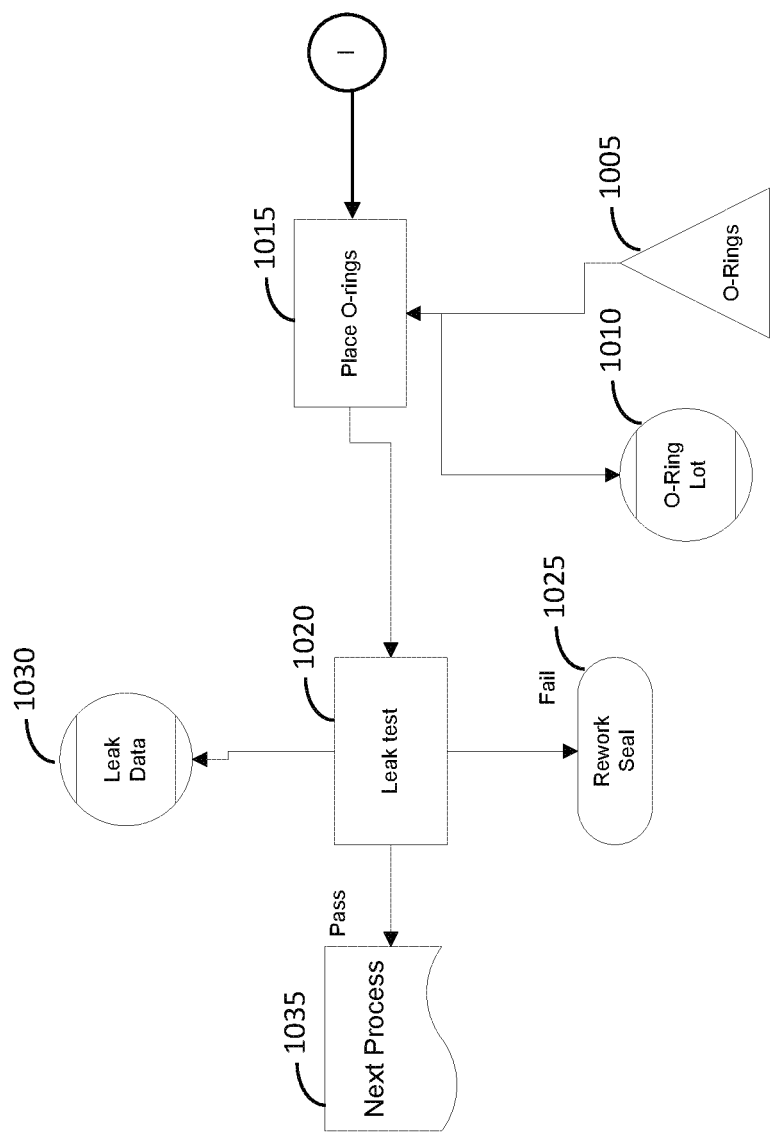
FIG. 10 is a partial process flow diagram for assembly of battery modules according to an exemplary implementation.
Figure 11:
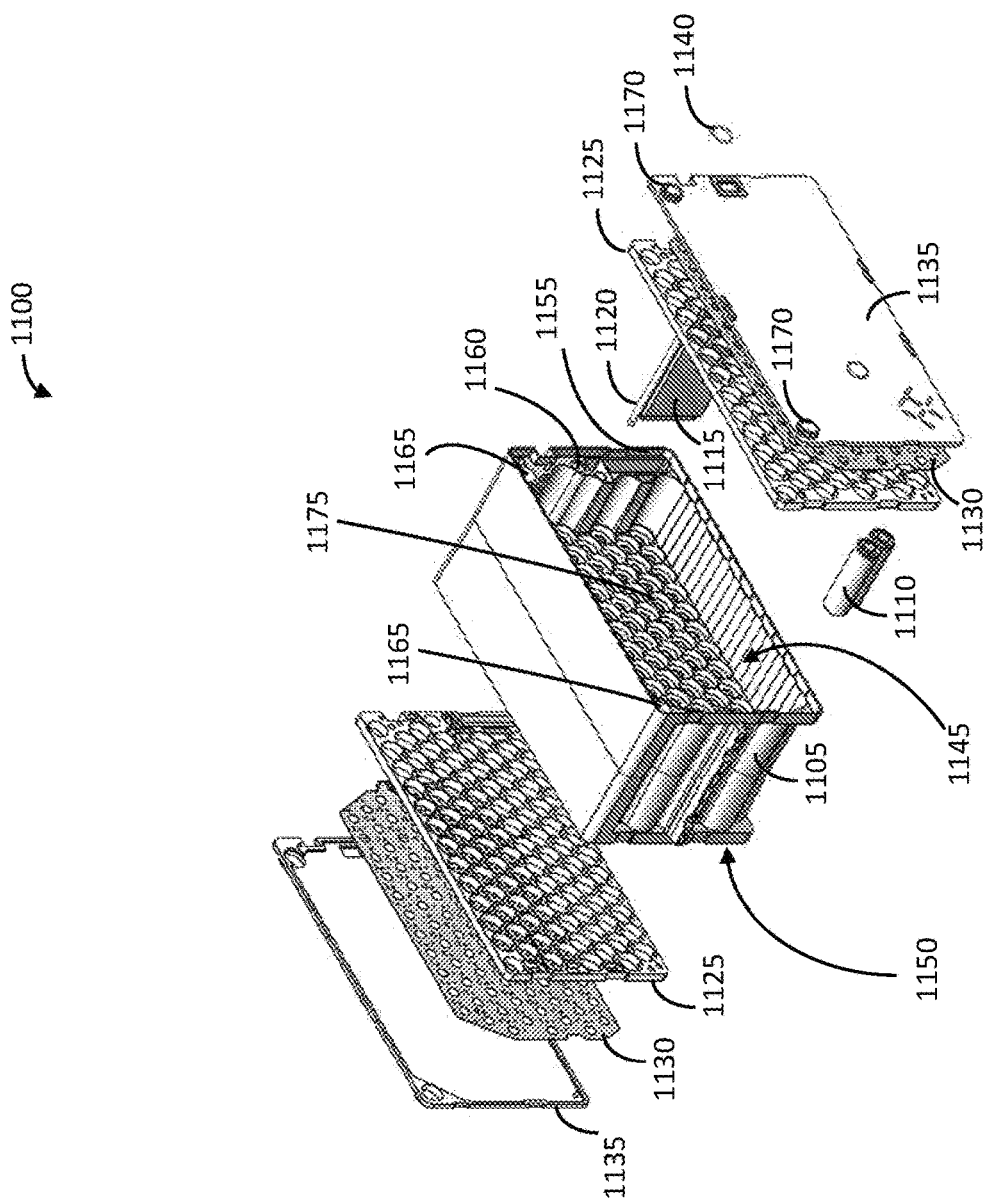
FIG. 11 is an exploded perspective view of an exemplary battery module.

Referring first to FIG. 11, an exploded perspective view of a battery module 1100 is illustrated to provide context for the process flow description in reference to FIGS. 1-10 that follows. The battery module 1100 can comprise a module shell 1105. The module shell 1105 can comprise a first opening 1145 for receiving a first plurality of battery cells 1110 therein. Although not visible in FIG. 11, the module shell 1105 can comprise a second opening 1150 opposite the first opening 1145 for receiving a second plurality of battery cells 1110 therein. An inner surface of the module shell 1105 can comprise a bottom battery cell retainer plate 1175 comprising a plurality of openings to at least partially receive the battery cells 1110 therein. The module shell 1105 can further comprise in proximity to an outer edge of the module shell 1105 a circuit board receiving slot 1155 and a copper bar receiving slot 1160. A circuit board 1115 and a copper bar 1120 can be inserted into their respective receiving slots 1155, 1160. Further, the module shell 1105 can comprise one or more passageways 1165 extending entirely through the module shell 1105 from the first opening 1145 to the second opening 1150 to allow for wiring to pass through the battery module 1100, for example when a plurality of battery modules 1100 are coupled together into a battery module string. A flex circuit 1130 can be coupled to a top battery cell retainer plate 1125, and the resulting assembly can be coupled to the module shell 1105 across the first opening 1145 to fix the first plurality of battery cells 1110 in place. A cover 1135 can then be coupled to the module shell 1105 to seal the first opening 1145. The cover 1135 can comprise one or more ports 1170 aligned with the passageways 1165. One or more O-rings 1140 (or other sealing mechanism as known in the art) can be placed onto each of the ports 1170. Similarly, a cell retainer plate 1125, a flexible circuit 1130, and a cover 1135 can be coupled to the module shell 1105 across the second opening 1150. The assembly and construction of the battery module 1100 will be discussed in detail below.

Referring now to FIG. 1 in conjunction with FIG. 11, a process flow for assembling a first half of the battery module 1100 can be initiated at step 105, and then one or more pallets (or other handling devices) carrying containers of battery cells 1110 can be moved from a storage area to a manufacturing line at step 110. Data can be captured and logged at step 120 on battery cell 1110 identification information such as manufacturer, lot number, model number, serial number, and date of manufacture. Additional data can be captured and logged at step 120 relevant to the manufacturing process such as date, time, operator name and identification number, environmental conditions (such as temperature and humidity), product for which the battery module 1100 is being built, and the like. The containers of battery cells 1110 can be depalletized at step 115, and the battery cells 1110 can be removed either individually or in groups of multiple battery cells 1110 from the container at step 125.

In certain embodiments, the battery cells 1110 can be removed from their containers at step 125 using robotic equipment. As the robotic equipment grasps one or more battery cells 1110, electrical contact can be made with each battery cell 1110 so that the robotic equipment can perform quality control evaluation of the battery cells 1110. For example, the voltage and impedance of each battery cell 1110 can be checked. If the results of the quality control evaluation indicate the battery cell 1110 is within acceptable parameters, the robotic equipment can transport the battery cell 1110 to step 140 to continue the process. If the battery cell 1110 fails the quality control evaluation, then the battery cell 1110 can be rejected at step 130. Data obtained for each quality control evaluation, for both pass and fail situations, can be logged at step 135.

In certain embodiments, the battery cells 1110 can be arranged in rows that correspond to the rows of openings in the bottom battery cell retainer plate 1175. Thus, the robotic equipment can grasp one or more of these rows of battery cells 1110 to facilitate placement of the battery cells 1110 into the battery module shell 1105 as described in more detail below.

Figure 12B:
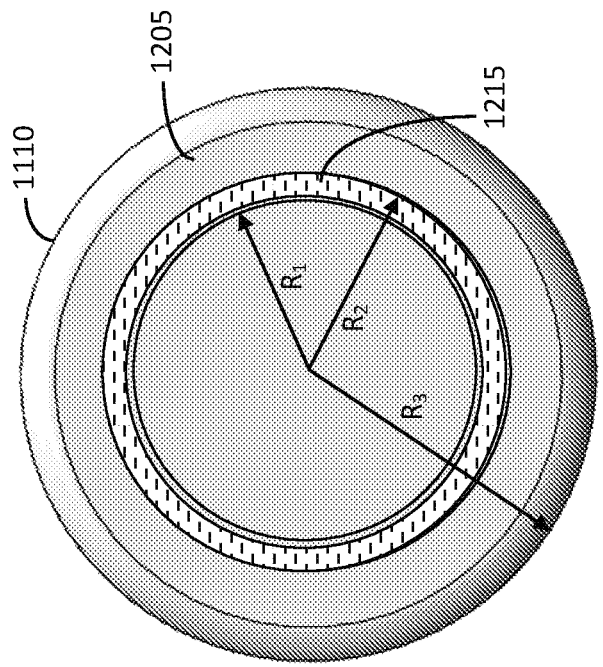
FIG. 12B is an end view of an exemplary battery cell
Figure 12A:
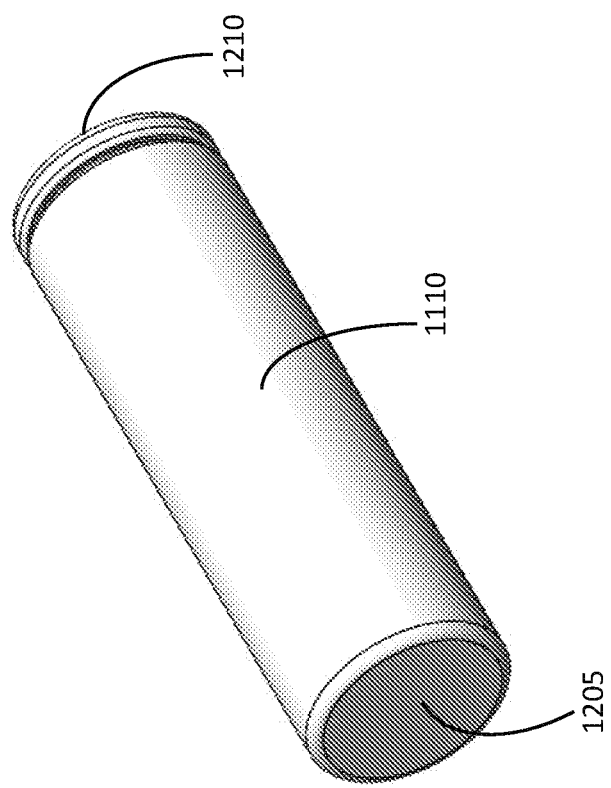
FIG. 12A is a perspective view of an exemplary battery cell.

In various embodiments, each battery cell 1110 can have a mounting end 1205 and an electrical connection end 1210 opposite the mounting end 1205 as illustrated in FIG. 12A. At step 140, after the battery cell 1110 has passed the quality control evaluation, the robotic equipment can apply an adhesive 1215 to the mounting end 1205 of the battery cell 1110 as illustrated in FIG. 12B. The adhesive 1215 can be paste, liquid, film pallets and tape so long as the adhesive is compatible with the submerged fluid or compatible with the base material that will be bonding to. In this instance, the adhesive is a one part adhesive with an accelerator (LORD 202 adhesive with LORD 4 accelerator bonding nickel plated steel to plastic (PC, PCABS . . . etc.). The LORD 202 is an acrylic based adhesive with viscosity ranging from 8,000-32,000 cP. This adhesive bonds to unprepared metals that require little to no substrate preparation and resists dilute acids, alkalis, solvents, greases, oils and moisture, provided excellent exposure to UV exposure, salt spray and weathering. This adhesive is a no-mix adhesive that requires an accelerant (LORD Accelerator 4) to kick start the curing process. In addition, the adhesive can be used in a mix-in using LORD Accelerator 17, 18 & 19. The adhesive is placed on the cell or inside the one piece half shell and the accelerator placed on the cell or the one piece half shell based on the process chosen. These two methods are valid. Depending on the process of applying the adhesive the critical aspects of the adhesive is its bond line from 0.020"-0.010" that gives the highest bond strength. The volume of the adhesive in this application case is 36 mg dispensed in a 4-12 dots with a 2.3 mm dot size. To optimize the dispensing time dots will be used to ensure that a uniform coverage of the adhesive is achieved during the bonding of cells and one piece half shells. The amount of accelerant is not critical as long as 0.002" film of accelerant is on the mating surface to activate the adhesive. Should other forms of adhesive be used, the bond line will change accordingly. Other adhesives can be used such as UV cure, humidity sensitive, and two part adhesives. For example, Loctite 3972, 4311 are candidates that one can consider using during the bonding process.

In various embodiments, each battery cell 1110 can have an essentially cylindrical shape with a radius ranging from R1=10 mm to R2=R3=21.05 mm as shown in FIGS. 12A and 12B. If R1 decreases from 10 mm it may affect the cooling of the cell as it will cover the cell vent and will not provide adequate cooling of the cell. Based on the design where the cells will be placed an optimum ring size shall be determined to limit the amount of glue covering or not covering the vent of the cell. For this process, an optimum ring width of 2.3 mm will generate the most consistent bond strength and adhesive coverage of the cell. In addition, instead of a ring dots ranging in all different sizes are applicable to achieve the same bond strengths and cell coverage. For this process, a dot size of 2.3 mm and a corresponding volume of 3.185 $mm^3$ will be satisfy the design requirements of holding the cells in place. The adhesive 1215 can be applied in a ring shape as illustrated in FIG. 12B, the ring of adhesive 1215 having an outer radius of R2 and an inner radius of R1. The volume of adhesive 1215 applied to the mounting end 1205 of the battery cell 1110 can be 2.0 $mm^3$-5 $mm^3$ per 269.48 $mm^2$ surface area to satisfy design requirements and optimum coverage of the cell and to provide the strongest bond strength.

After the adhesive 1215 has been applied to the mounting end 1205 of the battery cell 1110, a quality control evaluation can be performed to verify the proper placement and amount of adhesive 1215 at step 145. If a problem is discovered with the applied adhesive 1215, the battery cell 1110 can be moved to a rework station at step 150. Battery cells 1110 with properly applied adhesive 1215 can proceed to step 305 (see FIG. 3).

Figure 2:
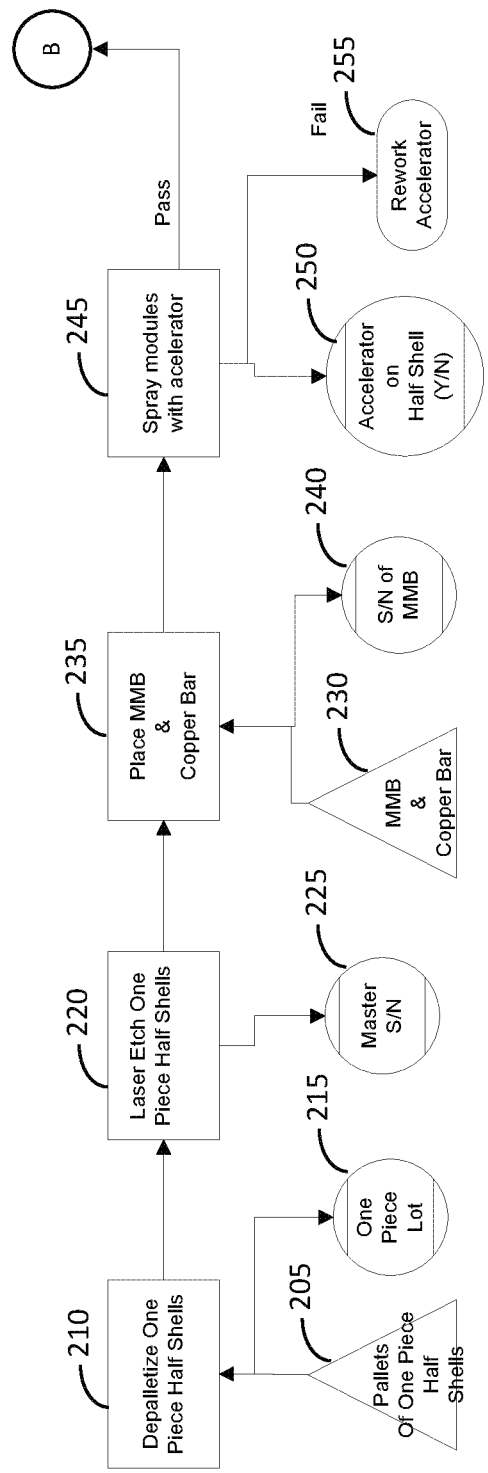
FIG. 2 is a partial process flow diagram for assembly of battery modules according to an exemplary implementation.

Referring now to FIG. 2 in conjunction with FIG. 11, one or more pallets (or other handling devices) carrying battery module shells 1105 can be moved from a storage area to the manufacturing line at step 205. The module shells 1105 can be depalletized at step 210. Data can be captured and logged at step 215 on module shell 1105 identification information such as manufacturer, lot number, model number, serial number, and date of manufacture. A unique identification number (e.g., a serial number) can be placed onto each of the module shells 1105 at step 220. The number can be printed, stamped, melted, laser etched, inscribed, or otherwise permanently affixed as is known in the art to the module shell 1105. The identification number can be logged at step 225.

Figure 13:
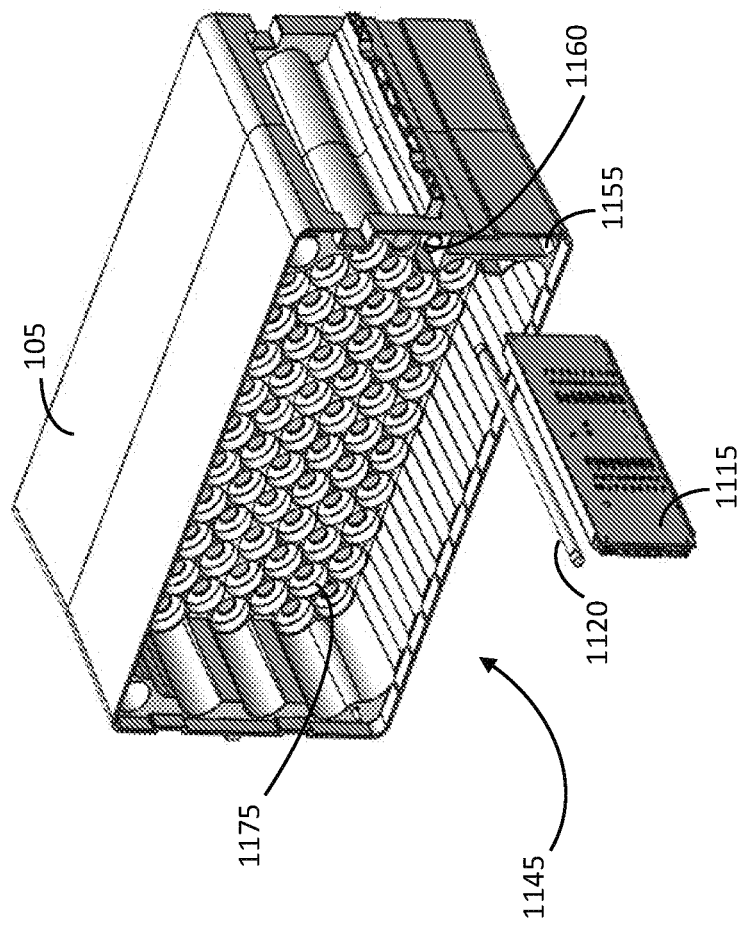
FIG. 13 is a perspective view of an exemplary module shell with a circuit board and copper bar.
Figure 14:
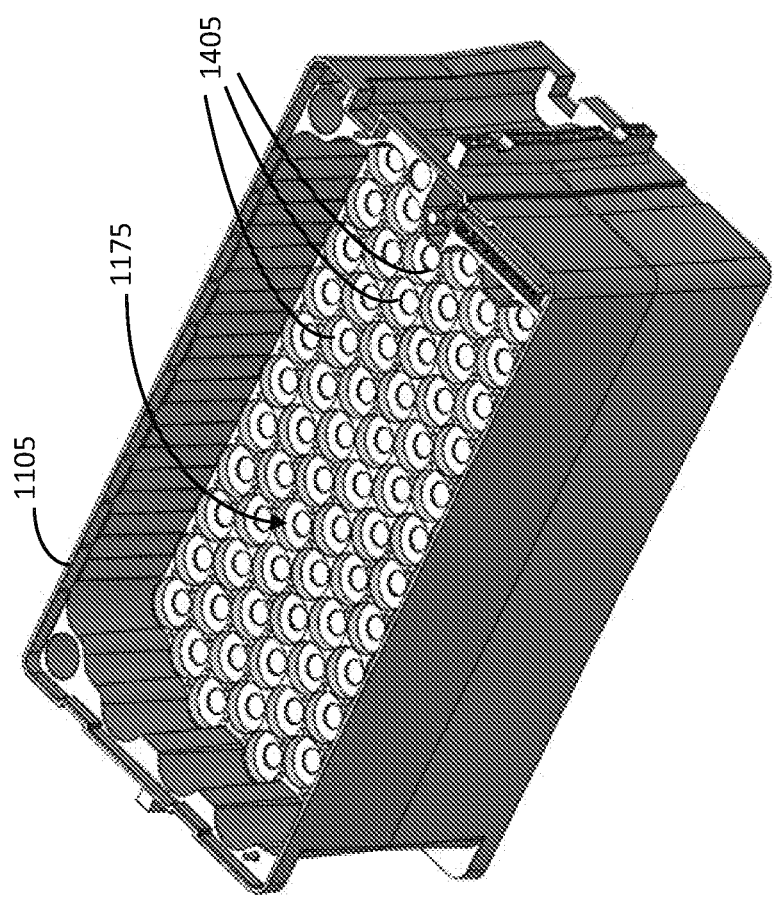
FIG. 14 is a perspective view of an exemplary module shell with an accelerator applied.

At step 230, the circuit boards 1115 and the copper bars 1120 can be moved from a storage area to the manufacturing line. Either manual or robotic equipment can be used to insert the circuit boards 1115 into the circuit board receiving slot 1155 and insert the copper bar 1120 into the copper bar receiving slot 1160 of the module shell 1105 at step 235 as illustrated in FIG. 13. Identification information for the circuit board 1115 can be captured at step 240, such as manufacturer, date of manufacture, and serial number. This information can also be related to the identification information for the module shell 1105 with which the circuit board 1115 is assembled. The circuit board 1115 can provide a variety of functions such as monitoring of battery module 1100 performance, current draw on the battery module 1100, condition of the battery cells 1110, and communication between and among multiple battery modules 1100 and one or more outside intelligent agents. The copper bar 1120 connects one side of the battery module to the next side and combines the two side voltages into one voltage. The module shell 1105 with assembled circuit board 1115 and copper bar 1120 can then move to the next step of the exemplary process in which an accelerator 1405 can be applied at step 245 within each of the openings in the bottom battery cell retainer plate 1175. In various embodiments, the accelerator 1405 can be applied at minimum of 0.002" thick film to unlimited volume so long as there is enough coverage of the bonding surface in a ring-shaped pattern within each of the openings in the bottom battery cell retainer plate 1175 as illustrated in FIGS. 14 and 15 so that the accelerator 1405 does not cover a center portion of each opening.

The accelerator 1405 can interact with the adhesive 1215 previously applied to the mounting end 1205 of each battery cell 1105 as described more fully below. The accelerator 1405 is a solvent mixture of Methylene chloride, trichloroethylene, methyl isobutyl ketone, benzoyl peroxide and methyl methacrylate. It crystalizes when sprayed on a substrate and needs to be applied to the LORD 202 in a dried state. Its viscosity is <10 cP with density of 1.22-1.28 $g/cm^3$. At step 250 a quality control evaluation of the applied accelerator 1405 can be performed to check that the proper amount of accelerator 1405 was applied and that the accelerator 1405 was applied in the proper pattern. Module shells 1105 that fail the quality control evaluation can be reworked at step 255, while module shells 1105 that pass the quality control evaluation can proceed to step 305 (see FIG. 3).

Figure 15:
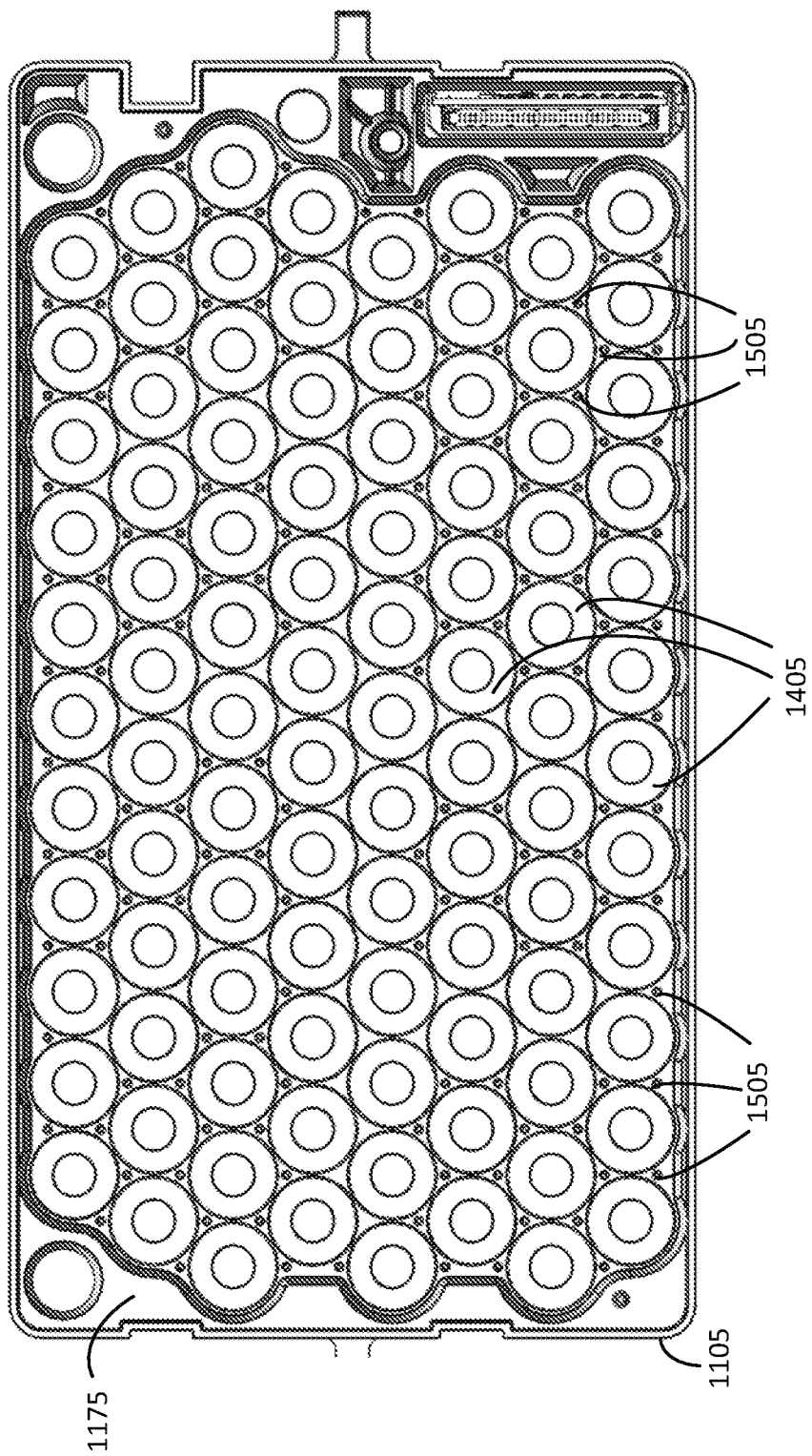
FIG. 15 is a top view of an exemplary module shell with an accelerator and a maskant applied.

FIG. 15 illustrates a top view of the module shell 1105 after application of the accelerator 1405 according to various embodiments. Now visible in this view are a plurality of coolant holes 1505 in the bottom battery cell retainer plate 1175. The coolant holes 1505 can allow a coolant to flow through the module shell 1105 and around the battery cells 1110 to remove excess heat that can be generated during charging or discharging of the battery cells 1110. In various embodiments, a maskant can be applied over the coolant holes 1505 to prevent stray or excess accelerator from clogging the cooling holes 1505. The maskant can be removed prior to further processing of the module shell 1105.

Figure 3:
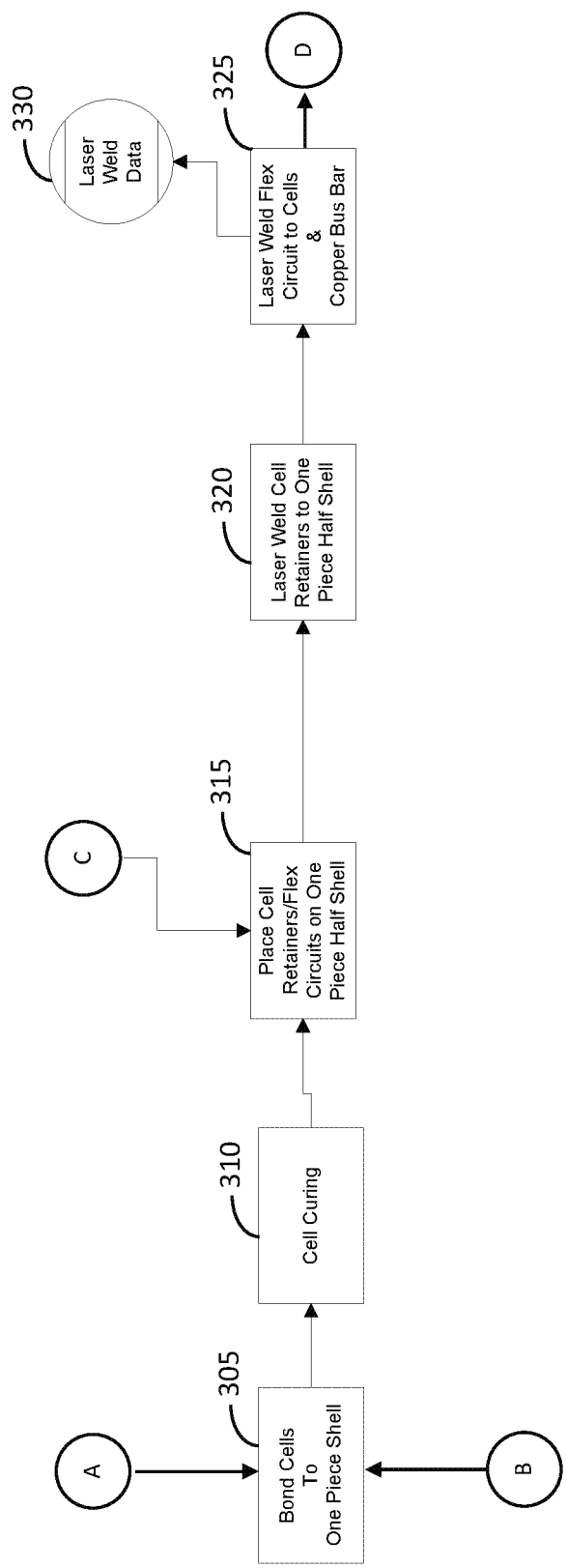
FIG. 3 is a partial process flow diagram for assembly of battery modules according to an exemplary implementation. Inputs A and B may continue from FIGS. 1-2. Input C may continue from FIG. 4. Output D may continue to FIG. 5.
Figure 16:
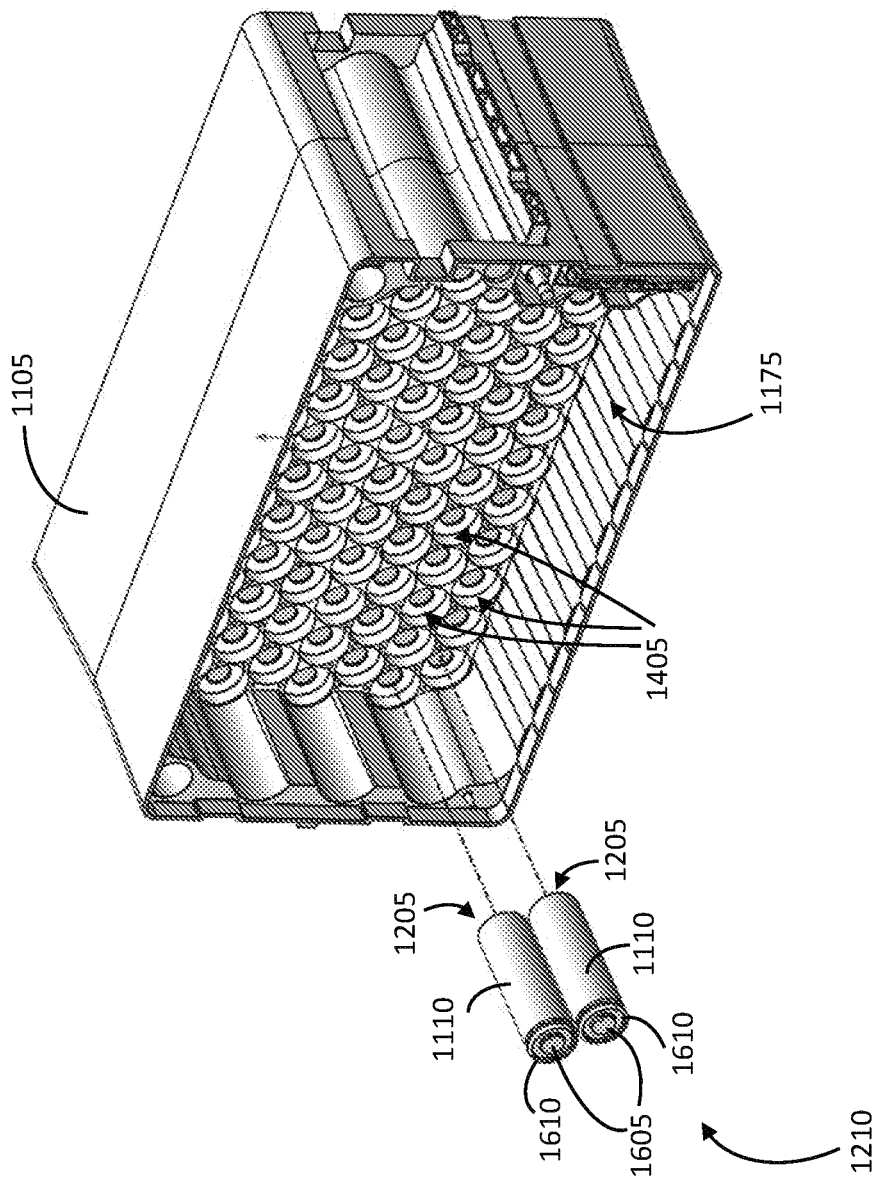
FIG. 16 is a perspective view of an exemplary module shell and battery cells.
Figure 17:
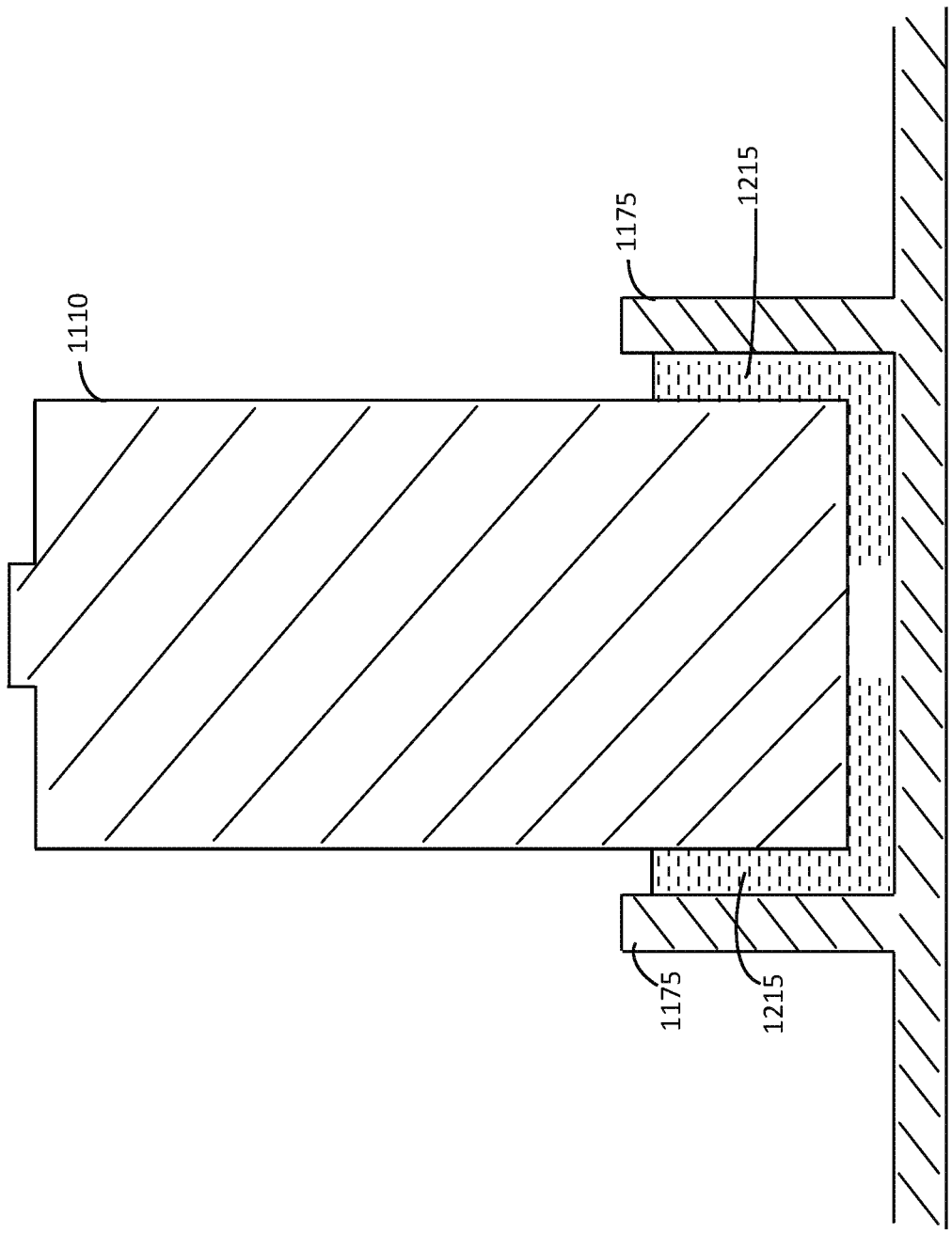
FIG. 17 is a side cross-sectional view of an exemplary battery cell mounted in a bottom battery cell retainer plate.

Referring now to FIG. 3 in conjunction with FIG. 11, the battery cells 1110 with the adhesive 1215 applied and the module shell 1105 with the accelerator 1405 applied both reach step 305. At this step, the battery cells 1110 can be inserted as illustrated in FIG. 16 through the first opening 1145 such that the mounting end 1205 of the battery cells 1110 engage the openings of the bottom battery cell retainer plate 1175 within the module shell 1105. A force can be applied to the battery cells 1110 such that the adhesive 1215 contacts the accelerator 1405, thereby starting a chemical reaction between the adhesive 1215 and the accelerator 1405 that will hasten curing of the adhesive 1215. In various embodiments as illustrated in the cross-sectional view of FIG. 17, the adhesive 1215 can begin to flow due to the applied force. The flowing adhesive 1215 can fill the gap between a side wall of the battery cell 1110 and the opening in the bottom battery cell retainer plate 1175 creating a bonding layer of adhesive 1215 along the mounting end 1205 of the battery cell 1110 and along the side wall of the battery cell 1110 and the opening in the bottom battery cell retainer plate 1175. This continuous bonding layer can provide a strong and durable bond between the battery cell 1110 and the module shell 1105 to withstand physical shock and vibration. In certain embodiments, the adhesive 1215 may not flow completely across the mounting end 1205 of the battery cell 1110 as illustrated in the cross-sectional view of FIG. 17. Having a gap in the adhesive 1215 coverage can provide better and more controlled thermal management within the battery module 1100. The force can be applied for about 1-2 minutes to allow for proper flow and curing of the adhesive 1215, although greater or lesser times are within the scope of the present disclosure depending on factors such as the type and composition of the adhesive 1215, type and composition of the accelerator 1405, amount of adhesive 1215 and accelerator 1405 applied, and environmental conditions such as temperature and humidity.

Figure 4:
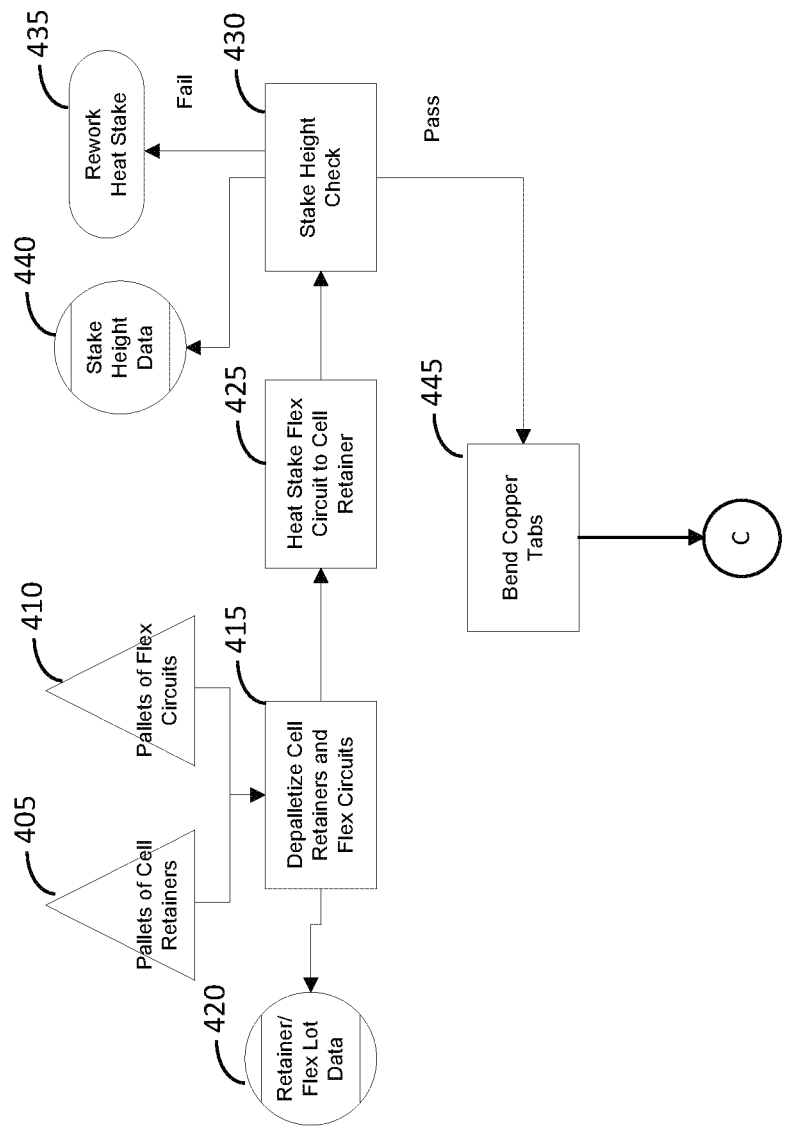
FIG. 4 is a partial process flow diagram for assembly of battery modules according to an exemplary implementation.

Referring now to FIG. 4 along with FIGS. 3 and 11, one or more pallets (or other handling devices) carrying the top battery cell retainer plates 1125 can be moved from a storage area to the manufacturing line at step 405, and one or more pallets (or other handling devices) carrying the flexible circuits 1130 can be moved from a storage area to the manufacturing line at step 410. The top battery cell retainer plates 1125 and the flexible circuits 1130 can be depalletized at step 415. Data can be captured and logged at step 420 on the top battery cell retainer plate 1125 and the flexible circuit 1130 identification information such as manufacturer, lot number, model number, serial number, and date of manufacture. At step 425, each of the flexible circuits 1130 can be assembled with one of the top battery cell retainer plates 1125. In various embodiments, the flexible circuit 1130 can be heat staked to the top battery cell retainer plate 1125 by ultrasonic welding, heat welding, or any other technique known in the art. Alternatively, the top battery cell retainer plate 1125 and flexible circuit 1130 can be assembled by any mechanical method known in the art.

Figure 18B:
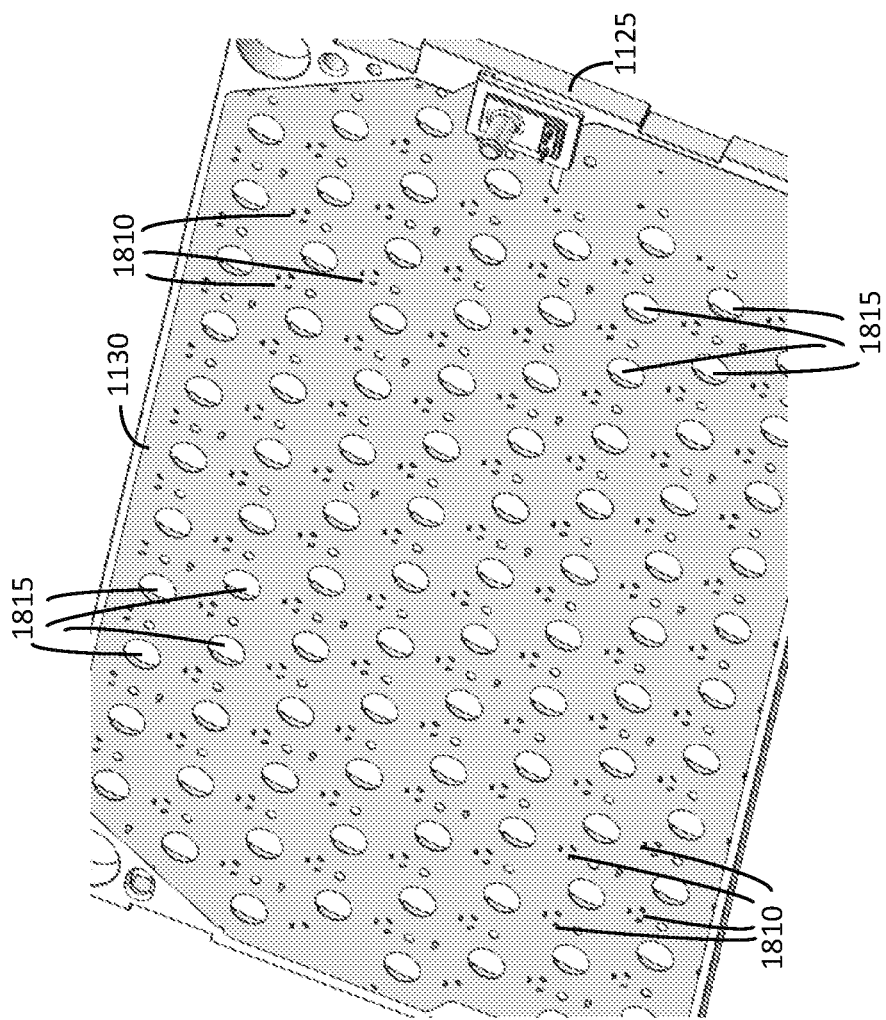
FIG. 18B is a perspective view of an exemplary assembled top battery cell retainer plate and flexible circuit.
Figure 18A:
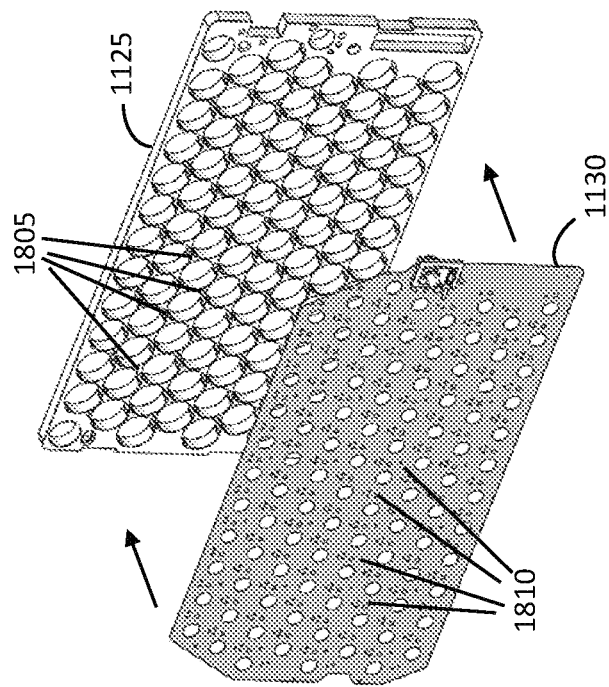
FIG. 18A is a perspective view of an exemplary top battery cell retainer plate and a flexible circuit showing how they are assembled.
Figure 19A:
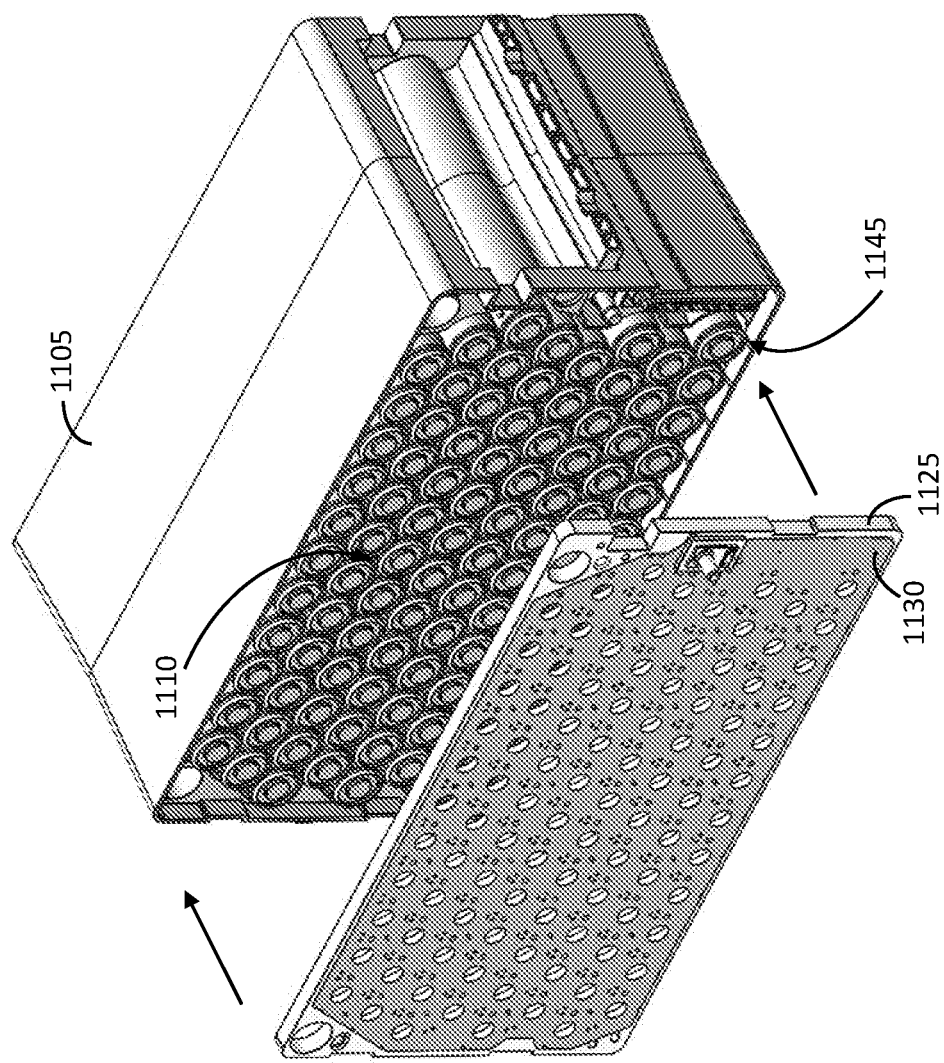
FIG. 19A is a perspective view of an exemplary module shell filled with battery cells and an assembled top battery cell retainer plate and flexible circuit showing how they are assembled.
Figure 19B:
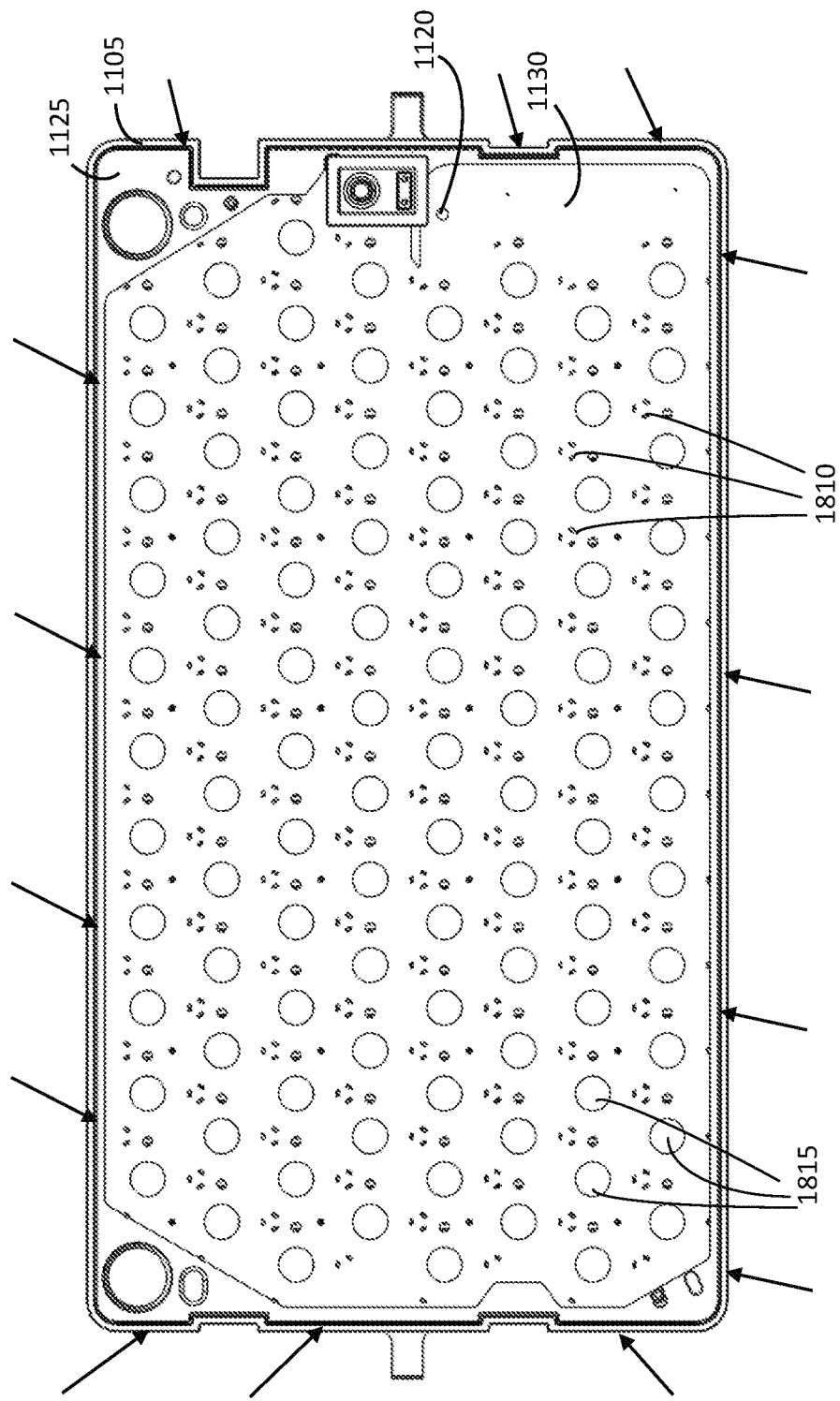
FIG. 19B is a top view of an exemplary assembled module shell, top battery cell retainer plate and flexible circuit.

Referring to FIGS. 18A and 18B according to various embodiments along with FIG. 11, the top battery cell retainer plate 1125 can have a plurality of studs 1805 dispersed across a surface. The flexible circuit 1130 can comprise a corresponding plurality of clearance holes 1810 that align with the studs 1805. When the flexible circuit 1130 is assembled with the top battery cell retainer plate 1125, the studs 1805 can protrude through the clearance holes 1810. The heat staking (or other) process can melt or otherwise deform the studs 1805, thereby coupling the flexible circuit 1130 to the top battery cell retainer plate 1125.

At step 430, a height of the studs 1805 (e.g., stake height) can be measured to ascertain that the studs have been deformed sufficiently that they will not interfere with later attachment of the cover 1135. Assemblies that fail the test can be sent for rework at step 435, and data collected during the test can be logged at step 440. Assemblies that pass the test can be processed further at step 445 where the flexible circuit 1130 can be coupled to each of the battery cells.

Referring back to FIGS. 16 and 18B, the battery cell electrical connection end 1210 (opposite the end of the battery cell 1110 that received the adhesive 1215) can comprise a center electrode 1605 and an outer rim electrode 1610. Each of the electrodes 1605, 1610 can be coupled to the flexible circuit 1130 to complete an electric circuit. The center electrode 1605 can align with openings 1815 in the flexible circuit 1130, and the outer rim electrode 1610 can align with tabs 1810 located adjacent to each opening 1815. At step 445, the tabs 1810 can be bent inwards (towards the battery cell 1110) slightly to reduce or eliminate any gap between the outer rim electrode 1610 and the tab 1810.

Now referring back to FIG. 3, the assembly of the top battery cell retainer plate 1125 and the flexible circuit 1130 can be joined in the process flow with the module shell 1105 with assembled battery cells 1110 at step 315. The top battery cell retainer plate 1125 and the flexible circuit 1130 assembly can be placed on the module cell 1105 across the first opening 1145 as illustrated according to various embodiments in FIGS. 19A and 19B. An entire seam (as indicated by the arrows in FIG. 19B) between an outer edge of the top battery cell retainer plate 1125 and an upper edge of the module shell 1105 defining the first opening 1145 can be laser welded (or other joining method known in the art) at step 320.

At step 325, the flexible circuit 1130 (now rigidly coupled to the module cell 1105 immediately above the electrical connection end 1210 of the battery cells 1110) can be welded or otherwise coupled to the electrical connection end 1210 of the battery cells 1110. In various embodiments, an optical scan can be conducted to ascertain positions of each of the battery cells 1110 relative to one or more fiducials (not shown) on the module shell 1105 to establish 2-dimensional X-Y coordinates of each battery cell 1110. In addition, the Z height of each battery cell 1110 can be determined during the scan. The optical scan data can be compared to stored 3-dimensional CAD data to fix the position of the battery cells 1110 with the rest of the battery module 1100 structure, including the flexible circuit 1130. A laser welding tab 1810 holding fixture can then be placed on top of the flexible circuit 1130. The holding fixture can comprise spring-loaded fingers that can press the tabs 1810 into contact with the outer rim electrodes 1610 and the flexible circuit openings 1815 into contact with the center electrodes 1605. A second optical scan can then be completed to determine the final Z height. The laser welder can then weld the tabs 1810 to the outer rim electrodes 1610 and the flexible circuit openings 1815 to the center electrodes 1605. In addition, the laser welder can weld the copper rod 1120 to the flexible circuit 1130. While the above description is presented in terms of laser welding, any other connection methodology known in the art can be substituted for laser welding and remain within the scope of the present disclosure. Data collected by the optical scans can be logged at step 330.

Figure 5:
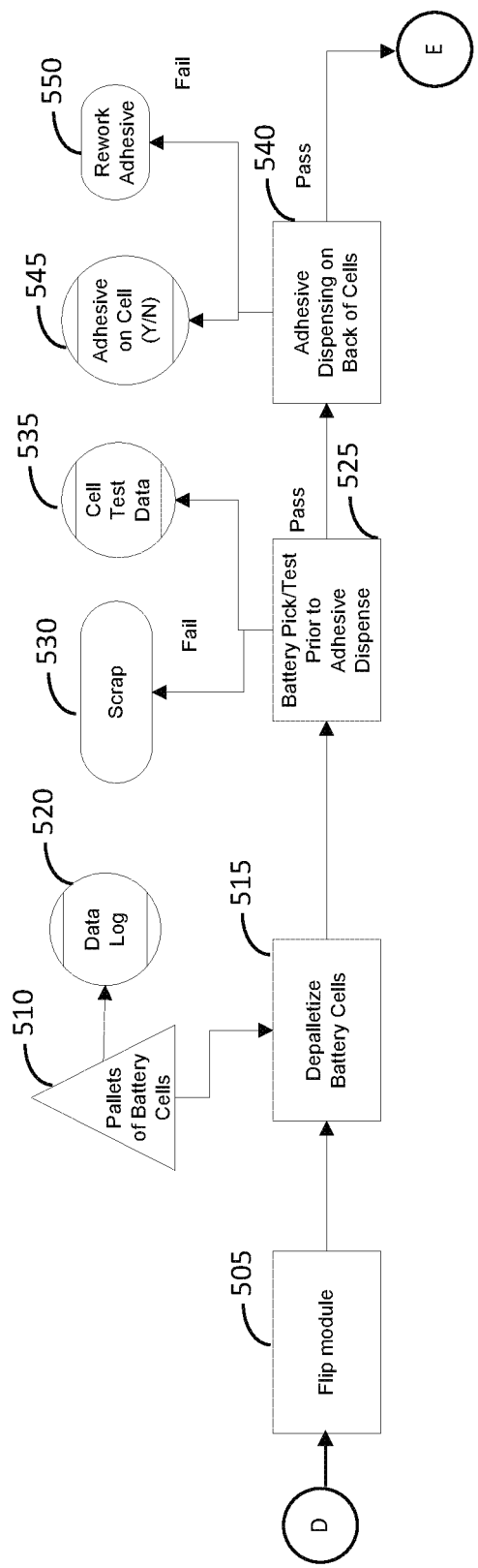
FIG. 5 is a partial process flow diagram for assembly of battery modules according to an exemplary implementation. Output E may continue to FIG. 6.
Figure 6:
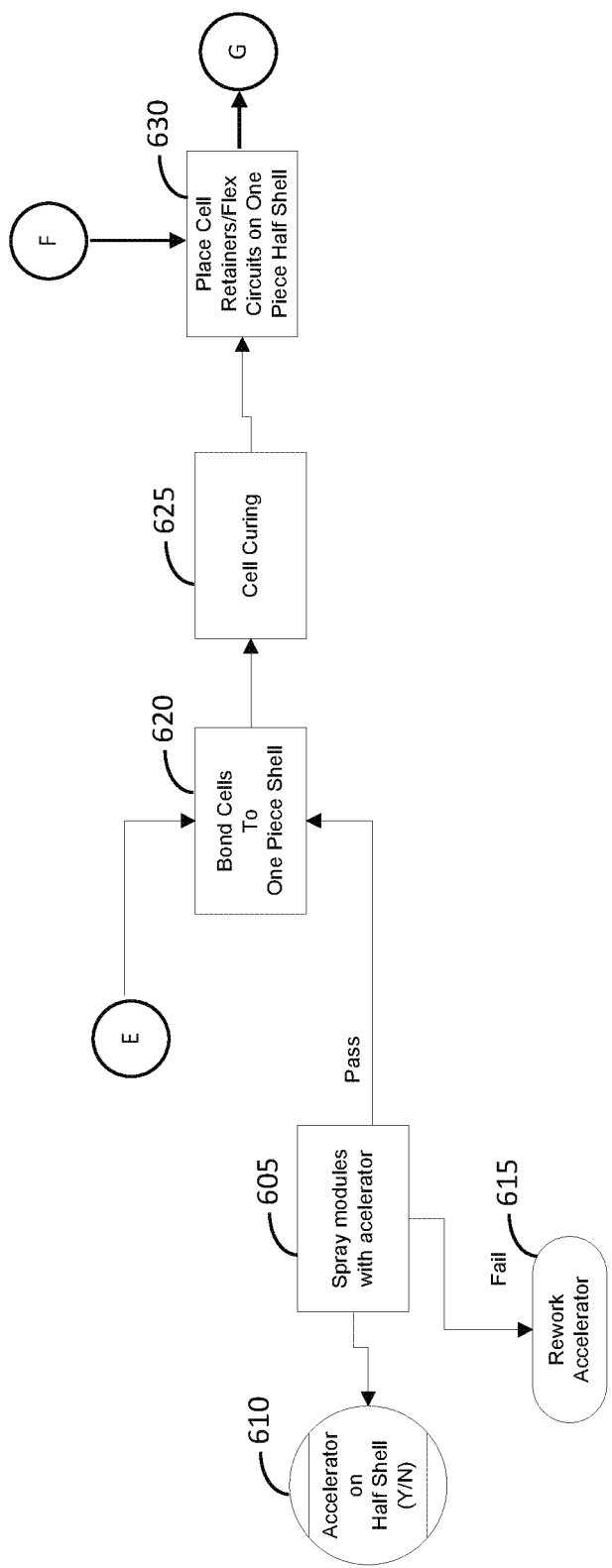
FIG. 6 is a partial process flow diagram for assembly of battery modules according to an exemplary implementation. Input F may continue from FIG. 7. Output G may continue to FIG. 8.
Figure 7:
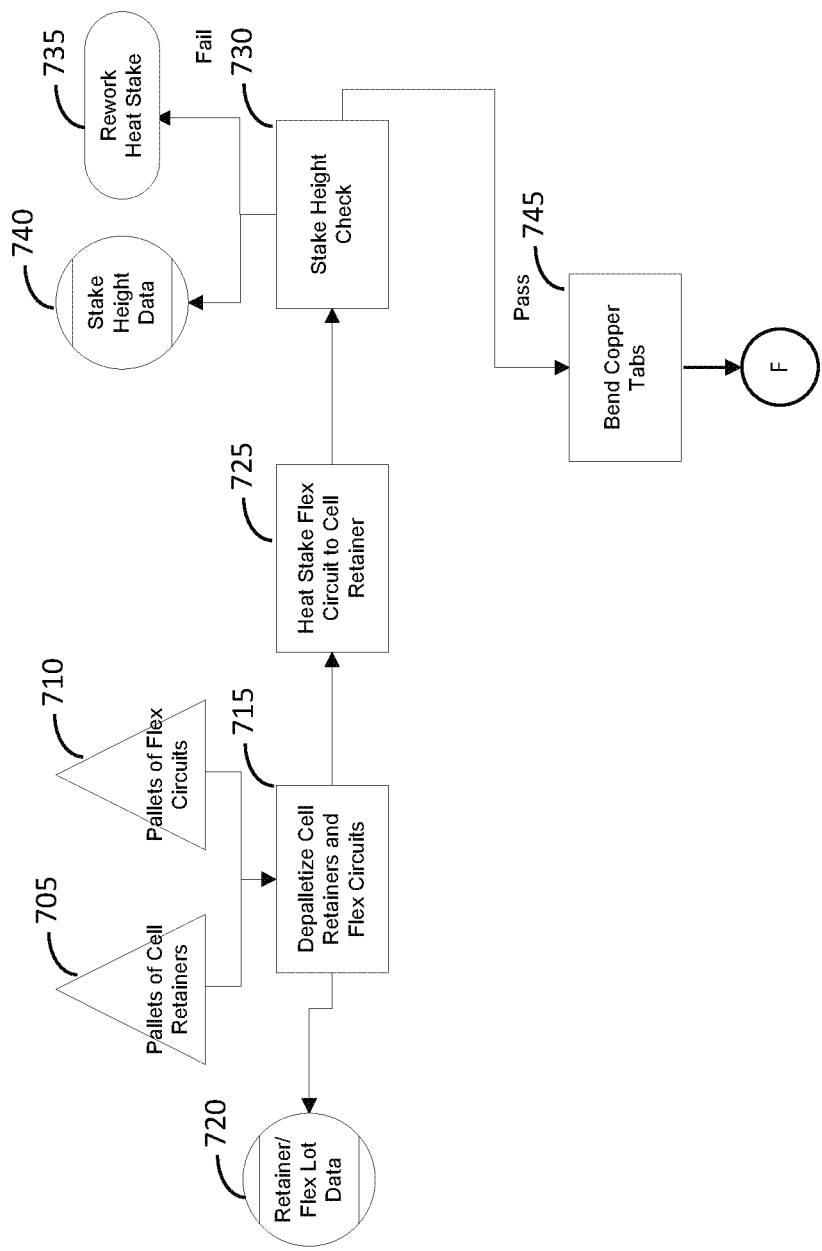
FIG. 7 is a partial process flow diagram for assembly of battery modules according to an exemplary implementation.

Referring now to the process flow diagram of FIG. 5, the module shell 1105 can be flipped at step 505 to expose the second opening 1150. The process flow for assembling a second half of the battery module 1100 can be initiated at step 510. The process steps for assembling the second half of the battery module 1110 are essentially the same as described above for the first half of the battery module 1100, with the exception of the depalletizing the module shells 1105, laser etching of the module shells 1105, and placement of the circuit board 1115 and copper bar 1120 that occurs at steps 205 through 240. Thus, steps 510 through 550 of FIG. 5 correspond to steps 110 through 150 of FIG. 1; steps 605 through 615 of FIG. 6 correspond to steps 245 through 255 of FIG. 2; steps 620 through 630 of FIG. 6 correspond to steps 305 through 315 of FIG. 3; steps 705 through 745 of FIG. 7 correspond to steps 405 through 445 of FIG. 4; and steps 805 through 815 correspond to steps 320 through 330 of FIG. 3.

Figure 8:
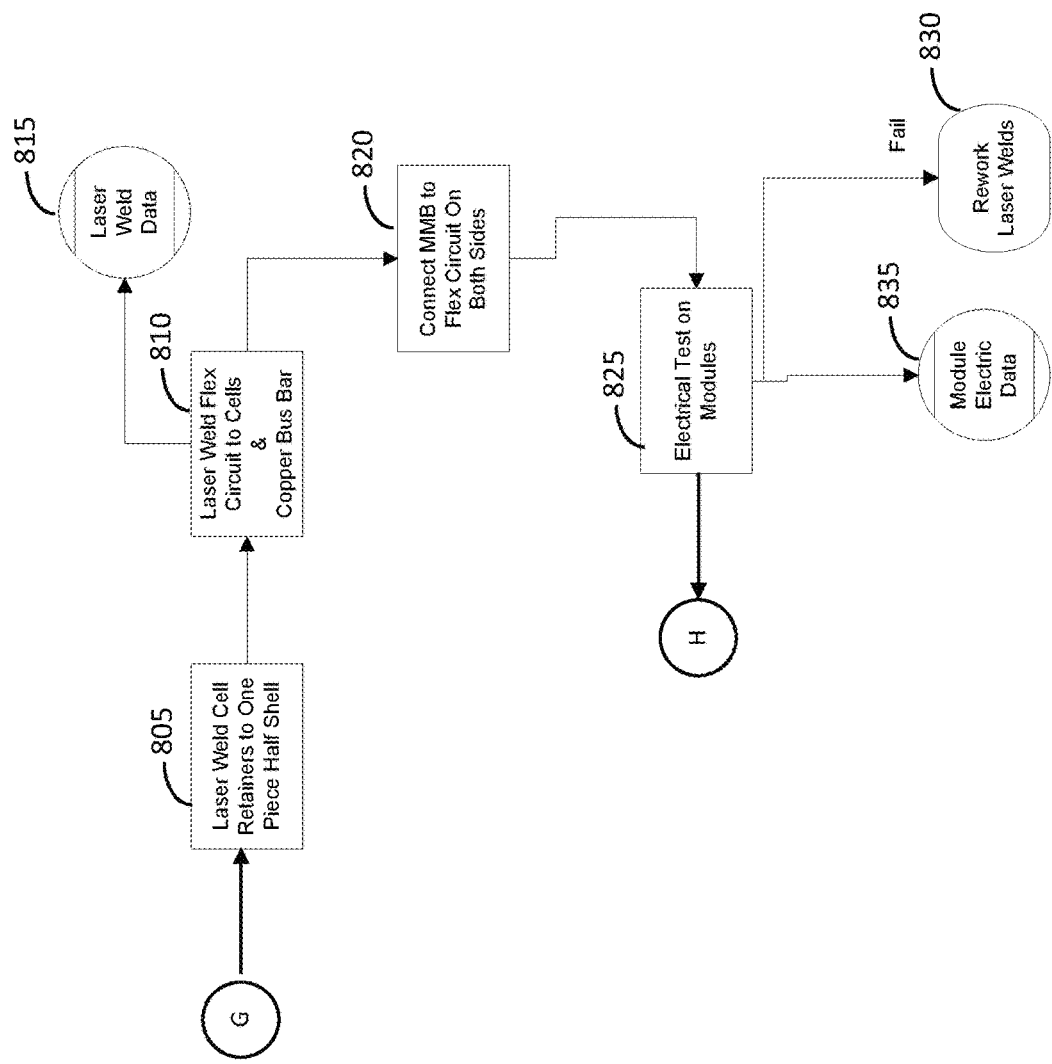
FIG. 8 is a partial process flow diagram for assembly of battery modules according to an exemplary implementation. Output H may continue to FIG. 9.

Beginning now at step 820 of FIG. 8, according to various embodiments the circuit board 1115 can be coupled to each of the flexible circuits 1130. At this point, the battery module 1100 can be electrically tested at step 825. The electrical test can ascertain that every battery cell 1110 is in communication with the corresponding flexible circuit 1130, that each of the flexible circuits 1130 is in communication with the copper bar 1120 and the circuit board 1115. The test can also ascertain the functionality of the circuit board 1115 such as monitoring the charge on each battery cell 1110, voltage across the battery module 1100, resistance across any portion of the electrical circuit of the battery module 1100, and any desired functionality. Any battery modules 1100 that fail the electrical testing of step 825 can be reworked at step 830. Data obtained during the electrical test and rework process can be logged at step 835.

Figure 20:
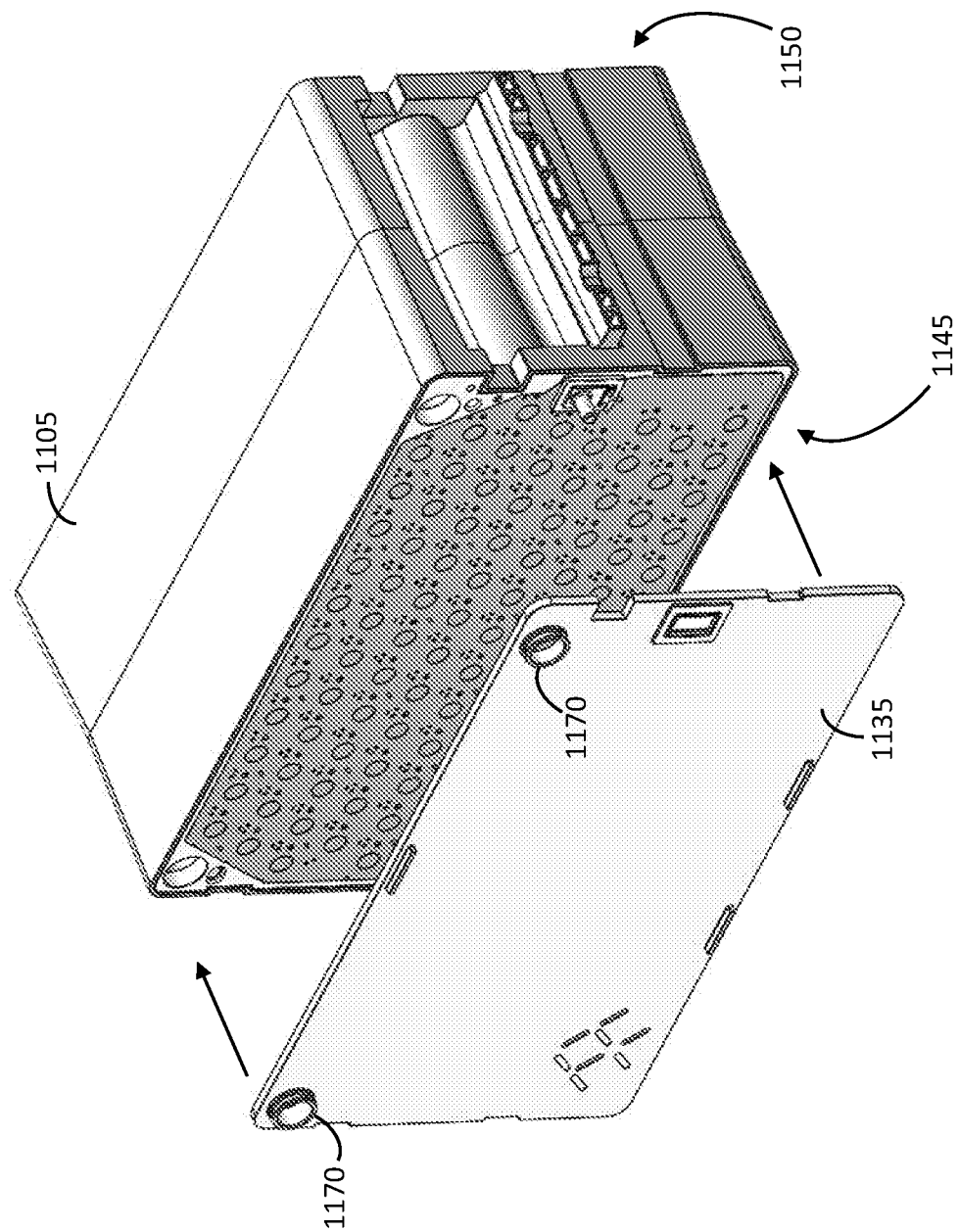
FIG. 20 is a perspective view of an exemplary module shell and a cover showing how they are assembled.

Referring now to FIG. 9 in conjunction with FIG. 11, one or more pallets (or other handling devices) carrying the covers 1135 can be moved from a storage area to the manufacturing line at step 905. The covers 1135 can be depalletized at step 910. Data can be captured and logged at step 915 on the cover 1135 identification information such as manufacturer, lot number, model number, serial number, and date of manufacture. At step 920, the cover 1135 can be placed across the first opening 1145 to enclose the first half of the battery module 1100 as illustrated in FIG. 20. An entire seam between an outer edge of the cover 1135 and an upper edge of the module shell 1105 defining the first opening 1145 can be laser welded (or other joining method known in the art) at step 925. Data obtained during the laser welding process can be logged at step 930. At step 935 the module shell 1105 can be flipped to expose the second opening 1150. Steps 940 through 965 can duplicate previously described steps 905 through 925 to attach the cover 1135 across the second opening 1150.

Figures 21A, 21B:
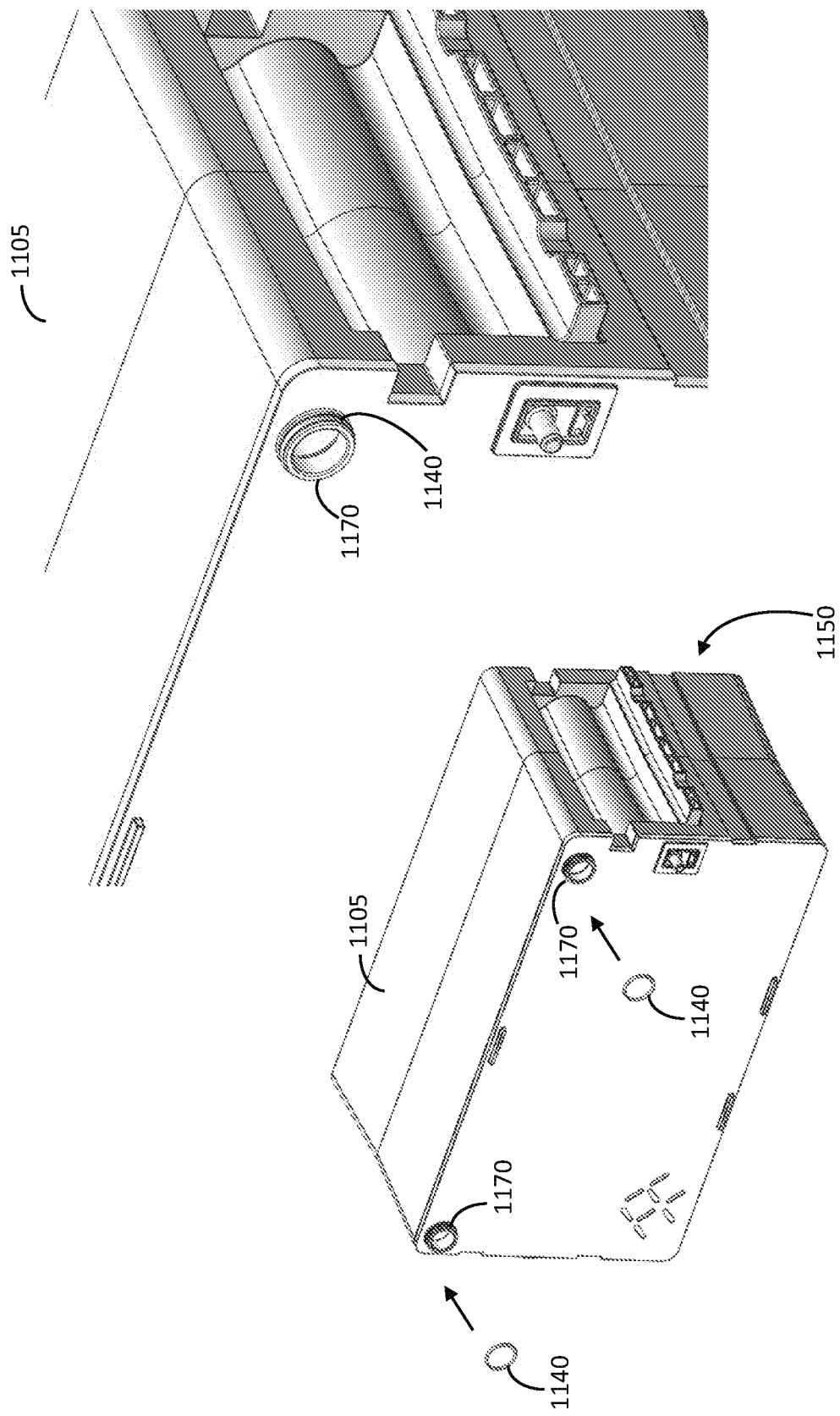
FIG. 21A is a perspective view of an exemplary assembled battery module and O-rings.
FIG. 21B is a perspective view of an assembled battery module with O-rings in place.

Referring now to FIG. 10 in conjunction with FIG. 11, one or more O-rings 1140 can be moved from a storage area to the manufacturing line at step 1005. Data can be captured and logged at step 1010 on the O-ring 1140 identification information such as manufacturer, lot number, model number, serial number, and date of manufacture. At step 1015, an O-ring 1140 can be placed on each port 1170 of the covers 1135 as illustrated in FIG. 21A according to various embodiments. FIG. 21B illustrates the O-rings 1140 in place on the ports 1170. The completed battery module 1100 can then be leak tested at step 1020. Battery modules 1100 that fail the leak test can be reworked at step 1025, and data collected during the leak test and rework process can be logged at step 1030. Battery modules 1100 that pass the leak test can be moved to the next process at step 1035.

With respect to the process flow steps illustrated according to various embodiments in FIGS. 1-10 movement of parts, assemblies, and supplies is described. The actual movement can take place by a variety of mechanisms, and selection of a particular mechanism can take into account factors such as number of items being moved, weight of items being moved, distance of movement, queuing space at a work station, availability of automation, and the like. The movement can comprise placing items in a container and physically moving the container to the next work stations, placing the container on a manual or automated conveyor, placing the containers on a manual or automated transport vehicle, placing the items or container in position for robotic movement, and the like. Any such movement mechanism can be employed at any of the process flow steps of FIGS. 1-10 as deemed appropriate.

Figure 22:
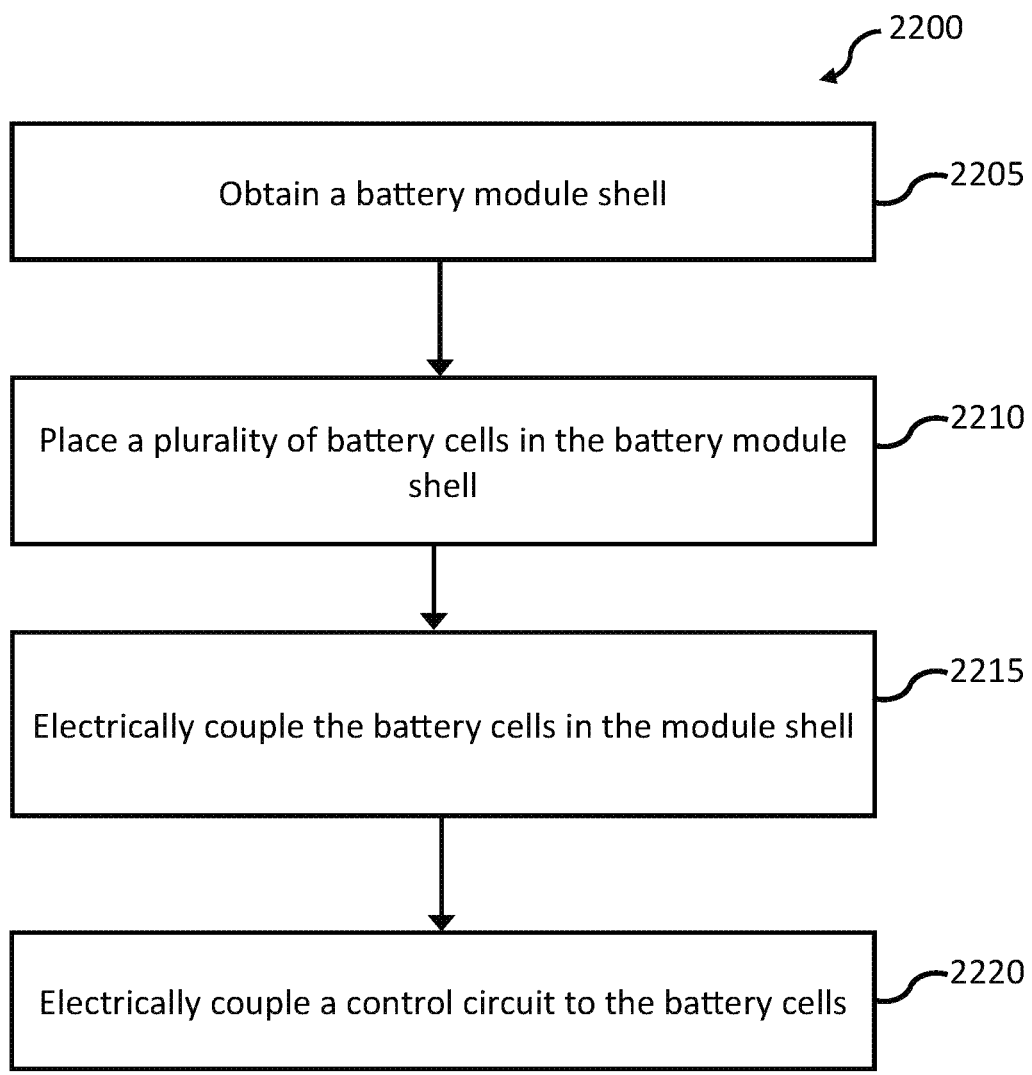
FIG. 22 is a flow diagram of an exemplary method for assembly of a battery module.

FIG. 22 is a flowchart of an exemplary method 2200 for assembly of a battery module 1100. At step 2205, a battery module shell 1105 can be obtained. A plurality of battery cells 1110 can be placed in the battery module shell 1105 at step 2210. At step 2215, the battery cells 1110 can be electrically coupled, and a control circuit 1115 can be electrically coupled to the battery cells 1110 at step 2220.

Figure 23:
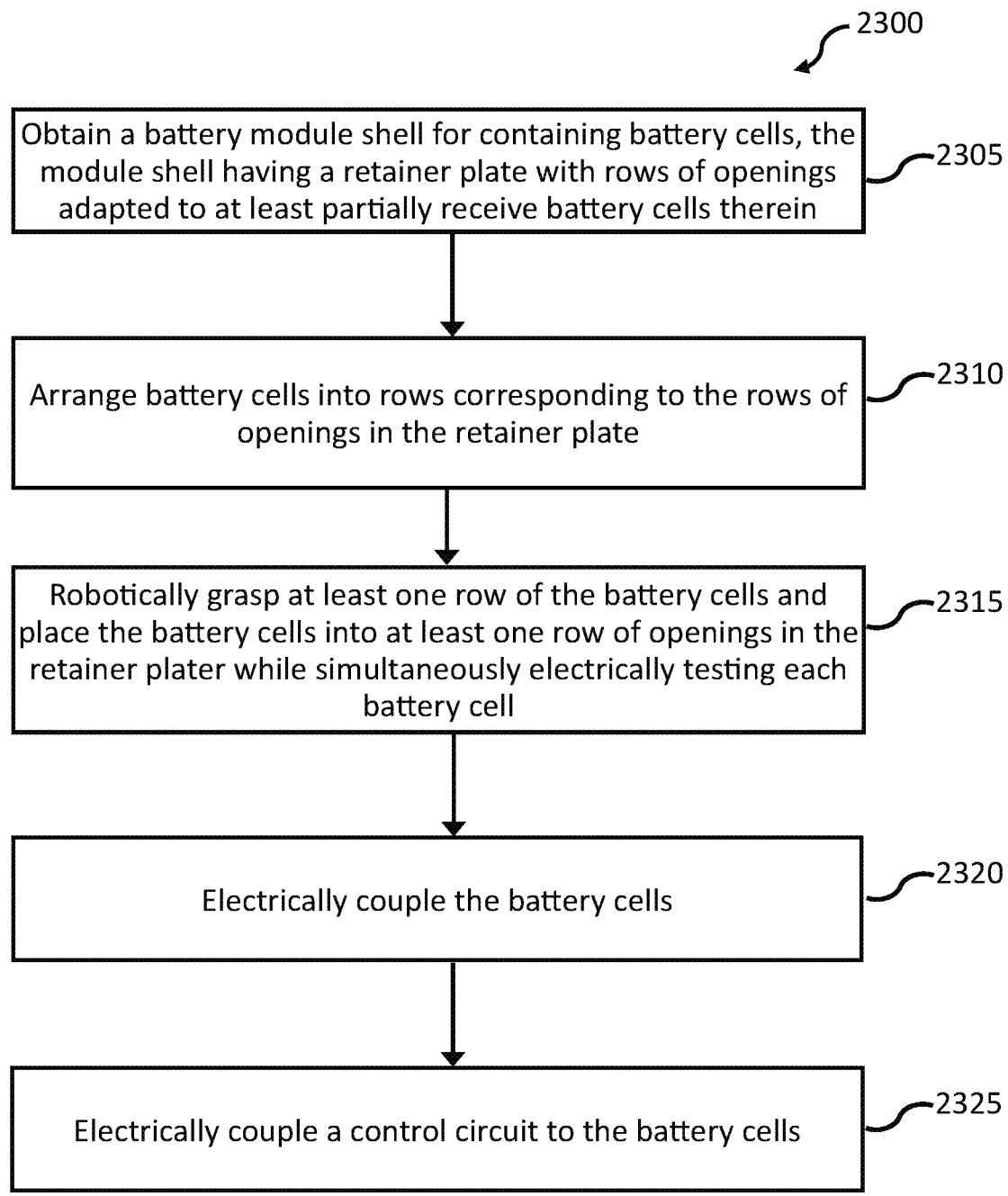
FIG. 23 is a flow diagram of an exemplary method for assembly of a battery module.

FIG. 23 is a flowchart of an exemplary method 2300 for assembly of a battery module 1100. At step 2305, a battery module shell 1105 for containing battery cells 1110 can be obtained. The module shell 1105 can have a retainer plate 1175 with rows of openings adapted to at least partially receive battery cells 1110 therein. At step 2310, battery cells 1110 can be arranged into rows corresponding to the rows of openings in the retainer plate 1175. At least one row of the battery cells 1110 can be robotically grasped at step 2315. The battery cells 1110 can be placed into at least one row of openings in the retainer plater 1175 while simultaneously electrically testing each battery cell 1110. At step 2320, the battery cells 1110 can be electrically coupled, and a control circuit 1115 can be electrically coupled to the battery cells 1110 at step 2325.

Figure 24:
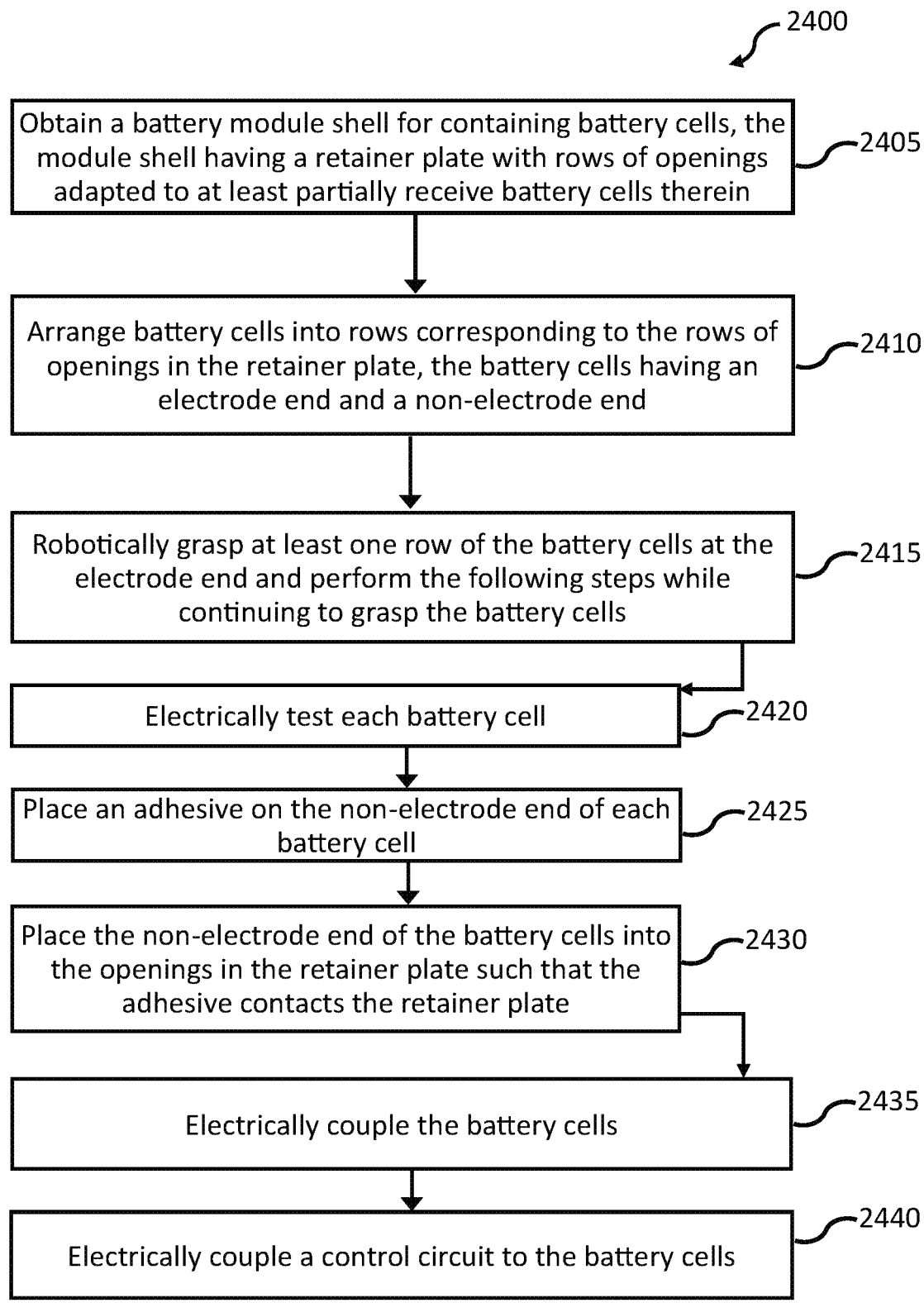
FIG. 24 is a flow diagram of an exemplary method for assembly of a battery module.

FIG. 24 is a flowchart of an exemplary method 2400 for assembly of a battery module. At step 2405, a battery module shell 1105 for containing battery cells 1110 can be obtained. The module shell 1105 can have a retainer plate 1175 with rows of openings adapted to at least partially receive battery cells 1110 therein. At step 2410, battery cells 1110 can be arranged into rows corresponding to the rows of openings in the retainer plate 1175. The battery cells 1110 can have an electrode end 1210 and a non-electrode end 1205. At least one row of the battery cells 1110 can be robotically grasped at step 2415 and the following steps can be performed while continuing to grasp the battery cells 1110: electrically testing each battery cell 1110 (step 2420); placing an adhesive 1215 on the non-electrode end 1205 of each battery cell 1110 (step 2425); and placing the non-electrode end 1205 of the battery cells 1110 into the openings in the retainer plate 1175 such that the adhesive 1215 contacts the retainer plate 1175 (step 2430). At step 2435, the battery cells 1110 can be electrically coupled, and a control circuit 1115 can be electrically coupled to the battery cells 1110 at step 2440.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as can be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A battery module comprising:
   a module shell comprising a first opening for receiving a first plurality of battery cells and a second opening opposite the first opening for receiving a second plurality of battery cells, wherein the module shell further comprises an inner surface comprising a bottom battery cell retainer plate comprising a plurality of openings to at least partially receive the first and second plurality of battery cells;
a circuit board and a copper bar inserted into respective receiving slots in proximity to an outer edge of module shell; and
one or more passageways extending entirely through an outer edge of the module shell from the first opening to the second opening, the one or more passageways configured to allow for wiring to pass through the battery module; and
a first flex circuit coupled to a first top battery cell retainer plate, both of which coupled to the module shell across the first opening;
a first cover coupled to the module shell to seal the first opening, the cover comprising one or more first ports aligned with the passageways;
a second flex circuit coupled to a second top battery cell retainer plate, both of which coupled to the module shell across the second opening; and
a second cover couple to the module shell to seal the second opening, the cover comprising one or more second ports aligned with the passageways;
wherein the first flex circuit comprises a first plurality of clearance holes that aligns with a plurality of studs of the top battery cell retainer plate.

2. The battery module of claim 1, further comprising: one or more O-rings placed onto each of the first ports and second ports.

3. The battery module of claim 1, wherein the first plurality of battery cells and the second plurality of battery cells are arranged in rows.

4. The battery module of claim 3, wherein each of the first and second plurality of battery cells comprises a mounting end and an electrical connection end, the mounting end configured to receive an adhesive when the battery module is assembled.

5. The battery module of claim 4, wherein the mounting end of each of the first and second plurality of battery cells is configured to receive an adhesive compatible with a submerged fluid.

6. The battery module of claim 4, wherein the electrical connection end comprises a center electrode and an outer rim electrode, each coupled to a flex circuit to complete an electric circuit.

7. The battery module of claim 1, wherein end of each of the first and second plurality of battery cells has a cylindrical shape with a radius of no more than 21.05 mm.

8. The battery module of claim 1, wherein the circuit board is configured to monitor a current draw of the battery module, condition of the first and second plurality of battery cells, and communication between the battery module and another battery module.

9. The battery module of claim 1, wherein the copper bar connects a first side of the battery module to a second side of the battery module, combining voltages from the first side and second side into one voltage.

10. The battery module of claim 1, wherein the bottom battery cell retainer comprises a plurality of coolant holes configured to allow a coolant to follow through the module shell and around the first and second plurality of battery cells.

* * * * *